(12) United States Patent
Nakahira

(10) Patent No.: US 8,339,961 B2
(45) Date of Patent: Dec. 25, 2012

(54) DYNAMIC BANDWIDTH ALLOCATION METHOD AND DYNAMIC BANDWIDTH ALLOCATION DEVICE

(75) Inventor: Yoshihiro Nakahira, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 202 days.

(21) Appl. No.: 12/736,028

(22) PCT Filed: Mar. 2, 2009

(86) PCT No.: PCT/JP2009/053868
§ 371 (c)(1),
(2), (4) Date: Sep. 2, 2010

(87) PCT Pub. No.: WO2009/110429
PCT Pub. Date: Sep. 11, 2009

(65) Prior Publication Data
US 2010/0322074 A1 Dec. 23, 2010

(30) Foreign Application Priority Data
Mar. 3, 2008 (JP) ................................. 2008-052129

(51) Int. Cl.
*G01R 31/08* (2006.01)
(52) U.S. Cl. .......................... 370/235; 370/437; 370/461
(58) Field of Classification Search ........................ None
See application file for complete search history.

(56) References Cited

U.S. PATENT DOCUMENTS

| | | | |
|---|---|---|---|
| 7,016,372 B2 * | 3/2006 | Haartsen | 370/461 |
| 2004/0252714 A1 | 12/2004 | Oh et al. | |
| 2007/0019957 A1 | 1/2007 | Kim et al. | |
| 2008/0080382 A1 * | 4/2008 | Dahshan et al. | 370/235 |

FOREIGN PATENT DOCUMENTS

| | | |
|---|---|---|
| JP | 5153154 A | 6/1993 |
| JP | 2005-012800 A | 1/2005 |
| JP | 2007-028640 A | 2/2007 |

OTHER PUBLICATIONS

Naoaki Yamanaka et al., "Performance Limitation of Leaky Bucket Algorithm for Usage Parameter Control and Bandwidth Allocation Methods", pp. 82-86, IEICE Trans. Commun., vol. E75-B, No. 2, Feb. 1992.

Naoaki Yamanaka et al., "Kakuteiteki UPC ni yoru ATM mo torahikku manejimento hoshiki (Traffic Management Method for ATM Network Using Precise UPC Scheme)", pp. 253-263, B-1, vol. J76-B-I, No. 3, Mar. 1993.

* cited by examiner

*Primary Examiner* — David Oveissi
(74) *Attorney, Agent, or Firm* — Rabin & Berdo, P.C.

(57) ABSTRACT

A dynamic bandwidth allocation method that can allocate bandwidth dynamically so as to guarantee communication in a minimum guaranteed bandwidth from each subscriber device and enable communication within a maximum communicable bandwidth from each subscriber device. A subscriber device asks a control functional unit at least once for bandwidth in which to transmit packets to switching office equipment, and the control function unit allows transmission in a minimum guaranteed bandwidth determined in advance for every subscriber device and generates control data for allocating to each subscriber device the bandwidth that it may use so as to maximize the bandwidth that can be used for packet transmission within the maximum transmittable bandwidth while maintaining fairness. The control functional unit transmits the control data to each subscriber device, thereby notifying each subscriber device of the bandwidth it can use, and each subscriber device transmits packets in the specified bandwidth.

20 Claims, 19 Drawing Sheets

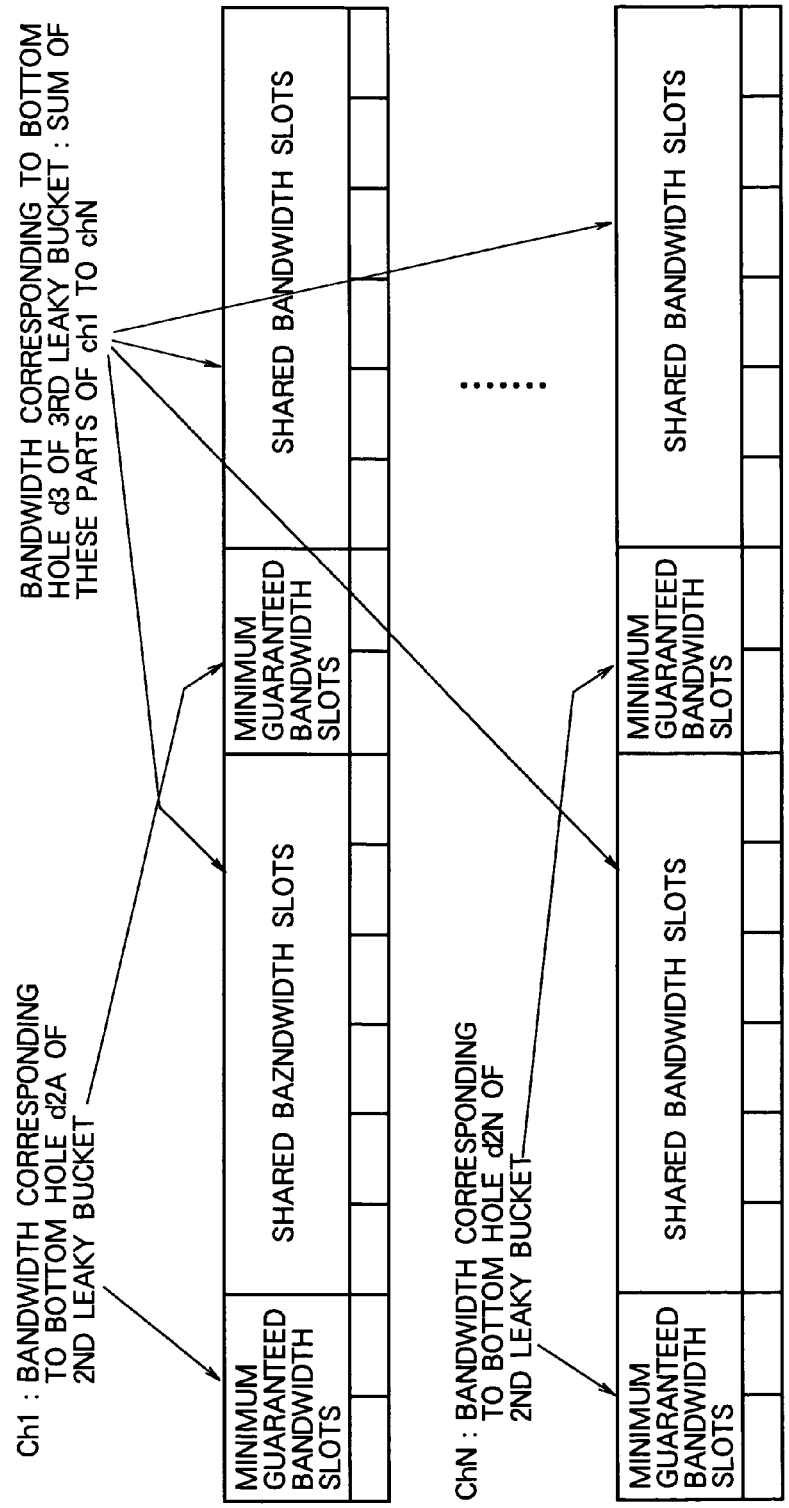

DYNAMIC BANDWIDTH ALLOCATION METHOD AND DYNAMIC BANDWIDTH ALLOCATION DEVICE

TECHNICAL FIELD

The present invention relates to a dynamic bandwidth allocation method and a dynamic bandwidth allocation device used to dynamically allocate the bandwidth of information (packets) transmitted from subscriber (user) terminals via subscriber devices (network units) to switching office equipment.

BACKGROUND ART

FIG. 1 is a drawing that will be used in the description of an example of bandwidth allocation in communication between switching office equipment 10 and subscriber terminals (personal computers, for example) via subscriber devices (network units) 11, . . . , 14. When the bandwidth available between the switching office equipment 10 and the subscriber devices 11, . . . , 14 is limited, as shown in FIG. 1, the individual subscriber devices 11, . . . , 14 declare parameters, such as communication bandwidths, to the switching office equipment 10 (step ST1). The switching office equipment 10 accepts the declarations from the subscriber devices 11, . . . , 14 if the declarations are acceptable, and rejects the declarations if they are unacceptable (step ST2). The subscriber devices 11, . . . , 14 carry out communication in the bandwidth permitted by the switching office equipment 10, and if communication is carried out in non-permitted (non-compliant) bandwidth, the information is discarded (step ST3). In order to prevent the discarding of information due to such violations, there is also a method in which, before transmitting, the subscriber devices 11, . . . , 14 again issue a request to transmit to the switching office equipment 10, receive permission to transmit together with transmission timing, channel bandwidth, and other information from the switching office equipment 10, and carry out transmission based on the information. The present invention mainly relates to communication in the allocated bandwidth, which is the operation in step ST3 in FIG. 1, but the invention is also applicable to the bandwidth request process in step ST1.

The optical access network illustrated in FIG. 2 is a more specific example of the configuration shown in FIG. 1. The optical access network shown in FIG. 2 includes an optical line terminal (OLT) 20 as switching office equipment and optical network units (ONUs) 21, . . . , 24, a coupler (splitter) 25, optical fibers 26a, . . . , 26d connecting the ONUs 21, . . . , 24 to the coupler 25, and a single optical fiber 27 connecting the OLT 20 to the coupler 25. Each ONU must transmit optical signals at timings such that its upstream signals do not collide with upstream signals from the other ONUs in the coupler 25. The OLT 20 notifies the ONUs 21, . . . , 24 of the transmission timings.

FIG. 3 illustrates a wireless code division multiple access (CDMA) configuration, which is another specific example of the configuration shown in FIG. 1. In the wireless communication illustrated in FIG. 3, a base station (switching office equipment) 30 communicates with subscriber terminals 31, . . . , 34 by using a shared air transmission medium and radio waves. In the CDMA communication system, a frequency band is divided into code channels (for example, CH1, . . . , CH4) and the channels are divided into timeslots. Optical access systems using optical CDMA technology work in the same way.

In communication systems such as the ones shown in FIGS. 1 to 3, a mechanism for allocating bandwidth to subscriber devices is essential. The dual leaky bucket algorithm disclosed in, for example, non-patent document 1 can be used to implement this mechanism. A traffic management method for ATM (asynchronous transfer mode) networks using a UPC (usage parameter control) scheme is disclosed in, for example, non-patent document 2.

FIG. 4 illustrates a UPC scheme using the leaky bucket algorithm. This scheme describes bandwidth control by use of a bandwidth control model in which information (traffic, packets, or tokens) is likened to 'water' and a queue used for holding information is likened to a 'leaky bucket'. This scheme uses two 'leaky buckets' (queues) 41, 42 and functions for reading information therefrom, as shown in FIG. 4, for each input line. Input 'water' 43 is input to a first-stage 'leaky bucket' 41. The input 'water' is information that a terminal wants to transmit; the amount of information may increase or decrease, or may become zero in some cases. A fixed amount of 'water' flows out of the first-stage 'leaky bucket' 41 per unit time (that is, a fixed amount of information per unit time is read from the queue). The declared peak rate Tp corresponds to the size of the 'hole' 41a in the first-stage 'leaky bucket' 41 (the amount of information read out per unit time). The volume 41b of the first-stage 'leaky bucket' defines the permissible amount of 'water' that violates (exceeds) the peak rate. If input of 'water' in violation of the peak rate persists over a long time, the 'water' overflows the first-stage 'leaky bucket' 41 and is discarded.

The size of the 'hole' 42a in the second-stage 'leaky bucket' 42 (the amount of information read out per unit time) corresponds to an average bandwidth size (average rate). The volume 42b of the second-stage 'leaky bucket' defines the permissible amount of 'water' that violates (exceeds) the average flow rate Ta of the output from the 'hole' 42a. That is, the volume of the second-stage 'leaky bucket' 42 defines the permissible range of temporal sway of the inflowing 'water' (arriving packets). If the amount of information Tpe that arrives during a certain time period Pe exceeds Ta×Pe (that is, Tpe>Ta×Pe), the violating traffic overflows the second-stage 'leaky bucket' 42 and is discarded.

The mechanism illustrated in FIG. 4 may be implemented in each subscriber's subscriber device (network unit) and configured so that packets (traffic) are input as 'water'. Alternatively, as described in the non-patent documents 1 and 2 mentioned above, as many mechanisms like the one shown in FIG. 4 as the number of subscribers may be implemented in the switching office equipment, and the subscriber devices may be configured so as to control their user data transmission timing and transmission time responsive to control data from the switching office equipment. In this case, the 'leaky buckets' receive declarations of communication bandwidth from the subscribers and receive tokens, which are information about traffic in the queues implemented in the subscriber terminals; the output from the 'leaky buckets' is transmitted to the subscriber devices (ONUs) as transmission permission signals; and the permitted amount of traffic is output from the subscriber devices.

Non-patent document 1: *Performance Limitation of Leaky Bucket Algorithm for Usage Parameter Control and Bandwidth Allocation Methods* by Naoaki Yamanaka et al., pp. 82-86, IEICE TRANS. COMMUN., Vol. E75-B, No. 2, February 1992

Non-patent document 2: *Kakuteiteki UPC ni yoru ATM mo torahikku manejimento hoshiki* (*Traffic Management*

*Method for ATM Network Using Precise UPC Scheme*) by Naoaki Yamanaka et al., pp. 253-263, B-1, Vol. J76-B-I, No. 3, March 1993

Patent document 1: Japanese Patent Application Publication No. H05-153154

There are two major problems with the above communication system for controlling traffic volume based on an average bandwidth and maximum bandwidth.

The first problem is that such a communication system may lead to waste of bandwidth (unused bandwidth). With the method shown in FIG. 4, if the inflow of 'water' exceeding the average bandwidth to the second-stage 'leaky bucket' persists for a prolonged time, 'water' overflows from the second-stage 'leaky bucket' and is discarded. On the other hand, if inflow of a small amount of 'water' to the second-stage 'leaky bucket' persists for a prolonged time, it will only be possible to transmit data at a much lower rate than the declared average value.

For example, under a simultaneous contract for average and peak rates, if a user who signed up for an average 1-Mbit/sec transfer rate and 2-Mbit/sec peak (maximum) rate performed communication for only one minute at only 64 kbits/sec yesterday but wants to communicate at 1.9 Mbit/sec for twenty hours today, the subscriber's request will not be accepted by most contracts and communication systems, which generally allow the peak rate for only several tens of seconds at most. There is some merit to the idea that it is only natural to discard traffic sent in excess of the declared value, and that it is the subscriber's fault if he or she did not send as much traffic as he or she could have the previous day.

There is also some merit, however, to the idea that if bandwidth is being left unused by other subscribers, a subscriber who wants to use that bandwidth should be allowed to do so. The available bit rate (ABR) scheme is a network usage scheme based on this idea. In this scheme, a subscriber device declares a minimum guaranteed bandwidth and the maximum accommodatable bandwidth when making a bandwidth declaration. The art for implementing this scheme includes the art disclosed in Patent Document 1. This art uses the terms 'minimum limit bandwidth' and the 'maximum limit bandwidth', but these terms may be considered conceptually the same, substantially, as the terms 'minimum guaranteed bandwidth' and 'maximum accommodatable bandwidth' in the present invention. When a subscriber requests communication in a bandwidth beyond the minimum guaranteed bandwidth, the art described in Patent Document 1 decides whether any bandwidth remains after subtraction of the minimum guaranteed bandwidth from the entire bandwidth, and if so, whether the bandwidth may be allocated or not, and sets the ATM switch based on the decision result, but the method of carrying out the calculations for allocating bandwidth to carry out this operation is not described.

The second problem will now be described. The above communication system assumes that the subscriber device has functions capable of transmitting signals arbitrarily in all channels and all timeslots in the upstream bandwidth. That is, it is assumed that a CDMA communication terminal, for example, has hardware and software capable of generating all types of sequences receivable by the switching office equipment. An implementation that enables transmission on all channels, however, may raise the cost of manufacturing the device. With a cost-cutting configuration that reduces the number of available channels and timeslots, however, there will be constraints on allocatable channels and timeslots, causing waste of bandwidth, and when a terminal has much signal traffic to transmit and other terminals with which it shares bandwidth also have much signal traffic to transmit, there is a strong possibility that the transmittable traffic will be constrained.

The present invention addresses the above problems of the prior art, with the object of providing a dynamic bandwidth allocation method and a dynamic bandwidth allocation device capable of dynamic bandwidth allocation which guarantees communication in the minimum guaranteed bandwidth declared by each subscriber and enables communication within the maximum accommodatable bandwidth declared by each subscriber. Another object of the invention is to provide a dynamic bandwidth allocation method and a dynamic bandwidth allocation device that can implement dynamic bandwidth allocation at a reduced device manufacturing cost.

SUMMARY OF THE DISCLOSURE

The dynamic bandwidth allocation method of this invention is a dynamic bandwidth allocation method used by a control unit, in transmission of packets from a plurality of terminals through subscriber devices to switching office equipment, to allocate bandwidth to the subscriber devices for use in transmitting information, the dynamic bandwidth allocation method comprising:

a step of sending a bandwidth request signal, requesting bandwidth for transmitting the packets from the subscriber devices to the switching office equipment, to the control unit at least once manually or from one of the subscriber devices;

a step in which the control unit permits said transmission in a minimum guaranteed bandwidth predetermined for each of the subscriber devices and generates control data for allocating bandwidth made available to the subscriber devices so as to maximize the bandwidth the subscriber devices can use to transmit the packets within a maximum transmittable bandwidth obtained by subtracting a sum of the minimum guaranteed bandwidths for the plurality of subscriber devices from a bandwidth available for said transmission by the entire plurality of the subscriber devices;

a step in which the control unit notifies each of the subscriber devices of the bandwidth in which it can transmit by sending the control data to the subscriber devices; and a step in which the subscriber devices transmit packets in the bandwidth of which notification is received from the control unit; wherein the step of generating the control data is executed by use of a plurality of pairs of a first information holding means and a second information holding means provided, for each of the subscriber devices, in the control unit, a third information holding means provided, for the subscriber devices in common, in the control unit, and a control means, and each of the first, second, and third information holding means has a function for output, at fixed temporal intervals, of a fixed quantity of tokens from an output port and a function for output, when the held tokens exceed a certain quantity, of the exceeding tokens or held tokens from an overflow output port, and the step of generating the control data includes:

a step in which tokens responsive to the bandwidth request signal are input to the first information holding means in each pair, a step in which, in said each pair, an action of outputting a fixed quantity of tokens from the output port of the first information holding means is carried out at fixed intervals and the output tokens are input to the second information holding means, a step in which, in said each pair, an action of outputting a fixed quantity of tokens from the output port of the second information holding means is carried out at fixed intervals, a step in which tokens are output to the third information holding means from the overflow output port of the second information holding means in said each pair, and a step in which the control means sends the subscriber devices the control data, based on the tokens output from the output port of the second information holding means and the tokens output from the output port of the third information holding means.

The dynamic bandwidth allocation device of this invention is a dynamic bandwidth allocation device used by a control unit, in transmission of packets from a plurality of terminals through subscriber devices to switching office equipment, to allocate bandwidth to the subscriber devices for use in transmitting information, the dynamic bandwidth allocation device comprising:

means, provided in each of the subscriber devices, for sending a bandwidth request signal, requesting bandwidth for transmitting the packets to the switching office equipment, to the control unit at least once;

means provided in the control unit to permit said transmission in a minimum guaranteed bandwidth predetermined for each of the subscriber devices and generate control data for allocating bandwidth made available to the subscriber devices so as to maximize the bandwidth the subscriber devices can use to transmit the packets within a maximum transmittable bandwidth obtained by subtracting a sum of the minimum guaranteed bandwidths for the plurality of subscriber devices from a bandwidth available for said transmission by the entire plurality of the subscriber devices;

means provided in the control unit to notify each of the subscriber devices of the bandwidth in which it can transmit by sending the control data to the subscriber devices; and means provided in each of the subscriber devices to transmit packets in the bandwidth of which notification is received from the control unit; wherein the means for generating the control data includes a plurality of pairs of a first information holding means and a second information holding means provided, for each of the subscriber devices, in the control unit, a third information holding means provided, for the subscriber devices in common, in the control unit, and a control means, and each of the first, second, and third information holding means has a function for output, at fixed temporal intervals, a fixed quantity of tokens from an output port and a function for output, when the held tokens exceed a certain quantity, of the exceeding tokens or held tokens from an overflow output port, and in the means for generating the control data, tokens responsive to the bandwidth request signal are input to the first information holding means in each pair, in said each pair, an action of outputting a fixed quantity of tokens from the output port of the first information holding means is carried out at fixed intervals and the output tokens are input to the second information holding means, in said each pair, an action of outputting a fixed quantity of tokens from the output port of the second information holding means is carried out at fixed intervals, tokens are output to the third information holding means from the overflow output port of the second information holding means in said each pair, and the control means sends the subscriber devices the control data, based on the tokens output from the output port of the second information holding means and the tokens output from the output port of the third information holding means.

Effect of the Invention

One effect obtainable from the present invention is that bandwidth can be dynamically allocated so that when information is transmitted from subscriber terminals to switching office equipment through subscriber devices, communication from each subscriber device can be guaranteed in a minimum guaranteed bandwidth, and communication from each subscriber device is made possible within a maximum accommodatable bandwidth. Another obtainable effect is that each subscriber is enabled to use the capability of the shared transmission medium without waste, which enables the configuration to be simplified, reducing device production cost.

BRIEF DESCRIPTION OF THE DRAWINGS

FIG. 19 illustrates the operation of the dynamic bandwidth allocation device according to the fifth embodiment.

DETAILED DESCRIPTION

<<1>> First Embodiment

<<1-1>> Structure of the First Embodiment

Figure 1:
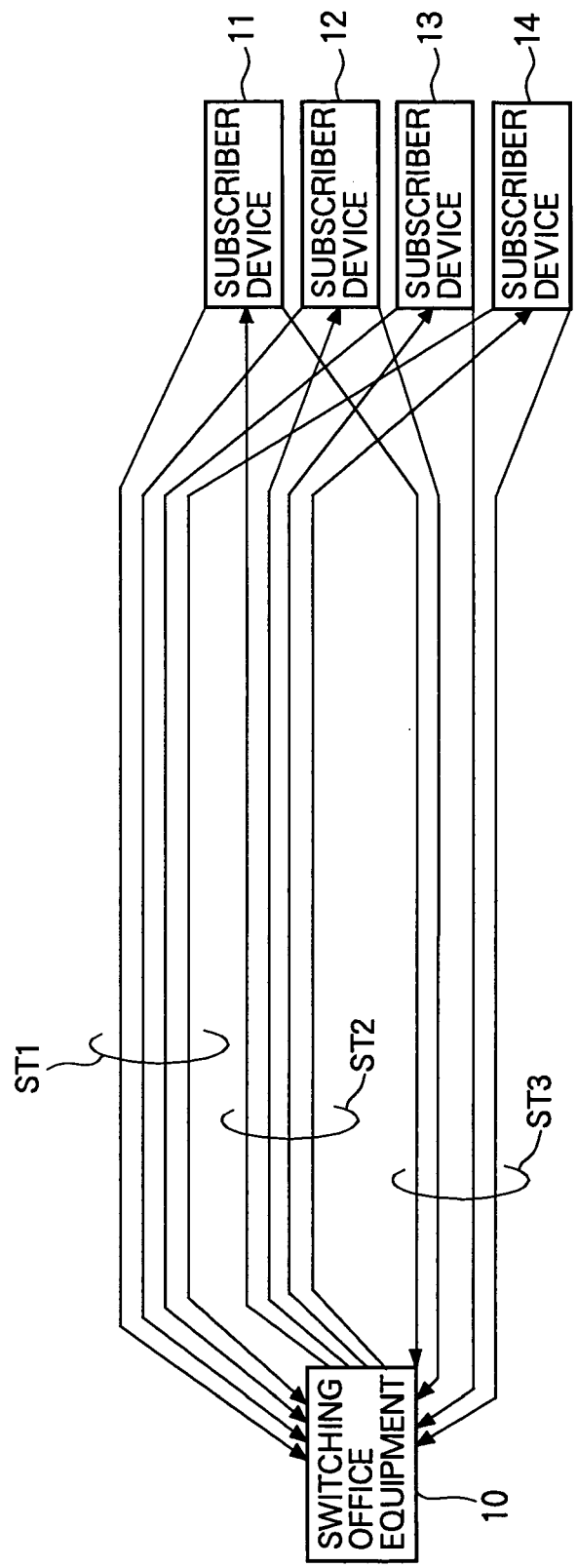
FIG. 1 shows an example of bandwidth allocation in communication between switching office equipment and subscriber terminals via subscriber devices (network units).
Figure 2:
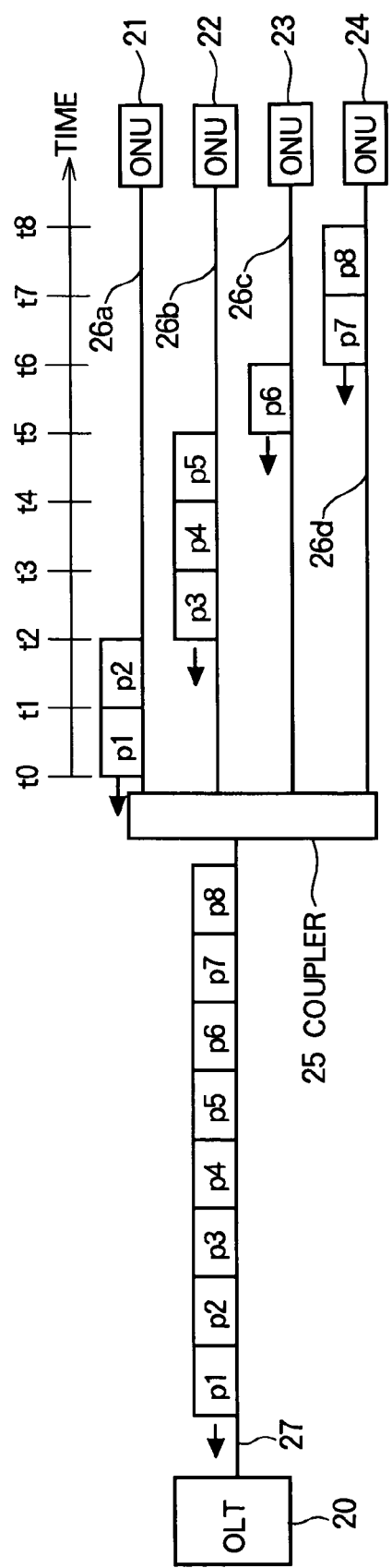
FIG. 2 illustrates an optical access network exemplifying the equipment shown in FIG. 1.
Figure 3:
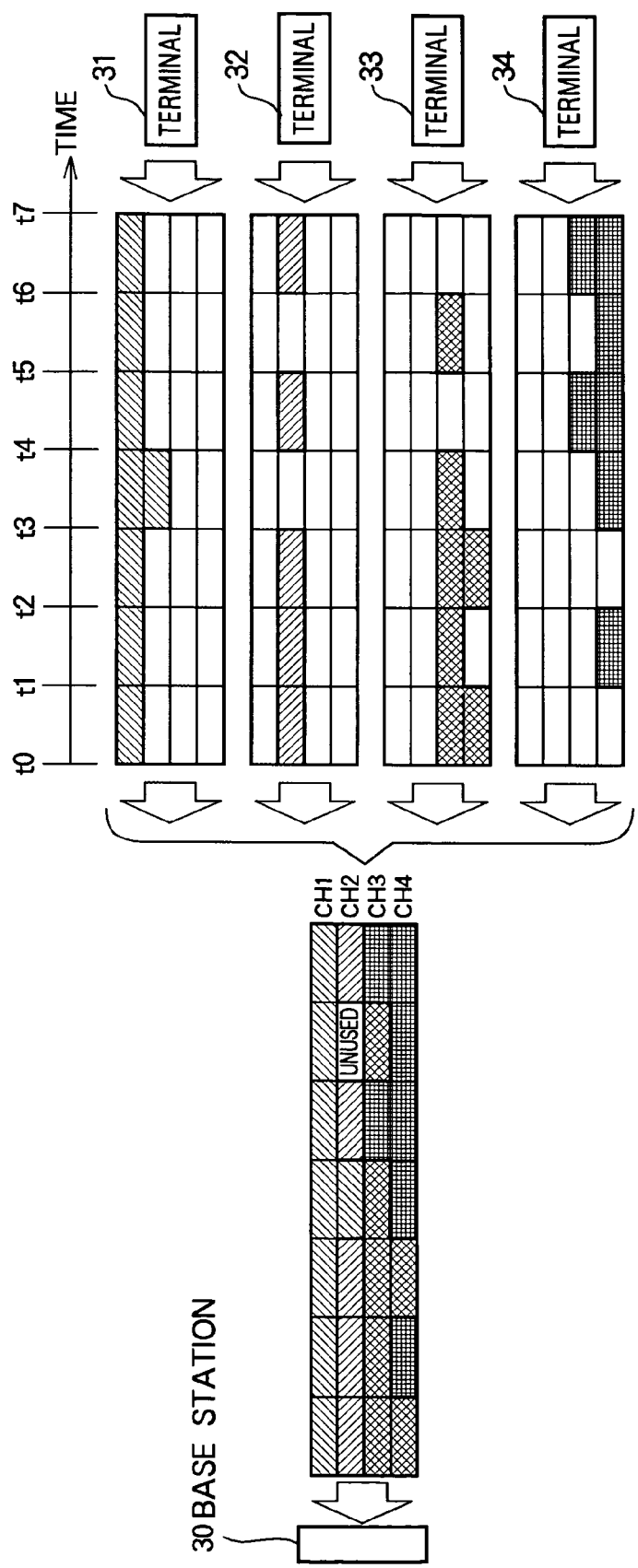
FIG. 3 illustrates a CDMA wireless access network as another example of the equipment shown in FIG. 1.
Figure 4:
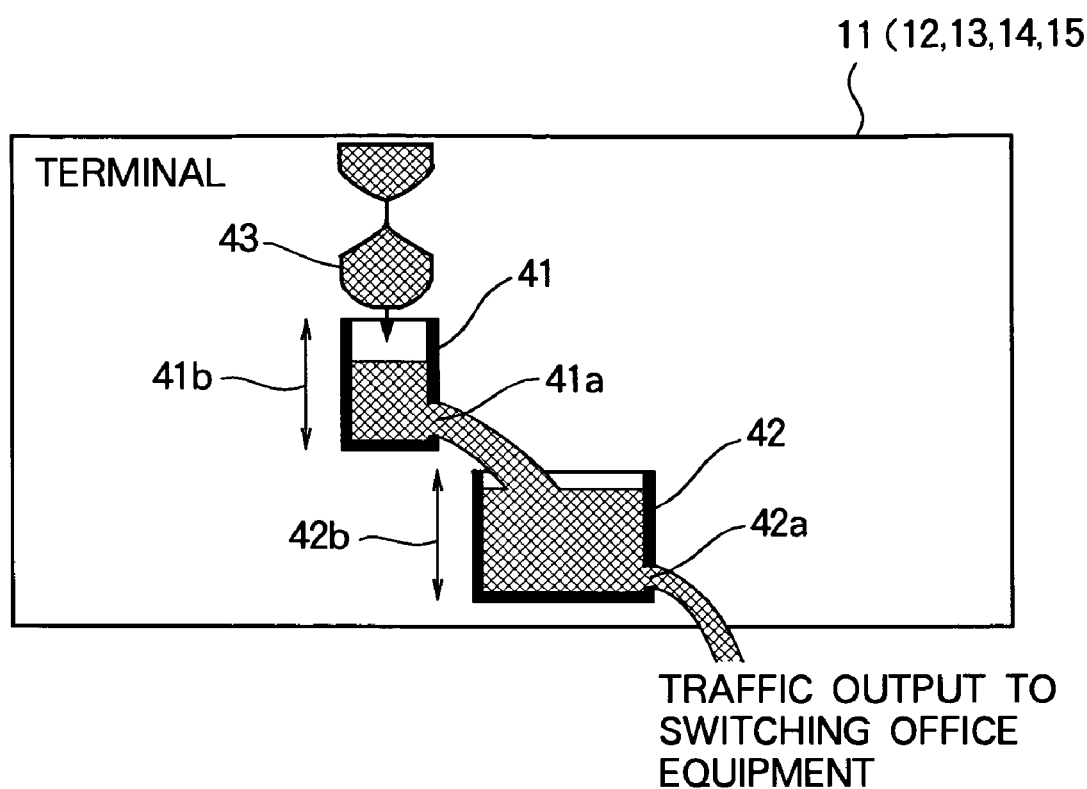
FIG. 4 illustrates UPC with the leaky bucket algorithm.
Figure 5:
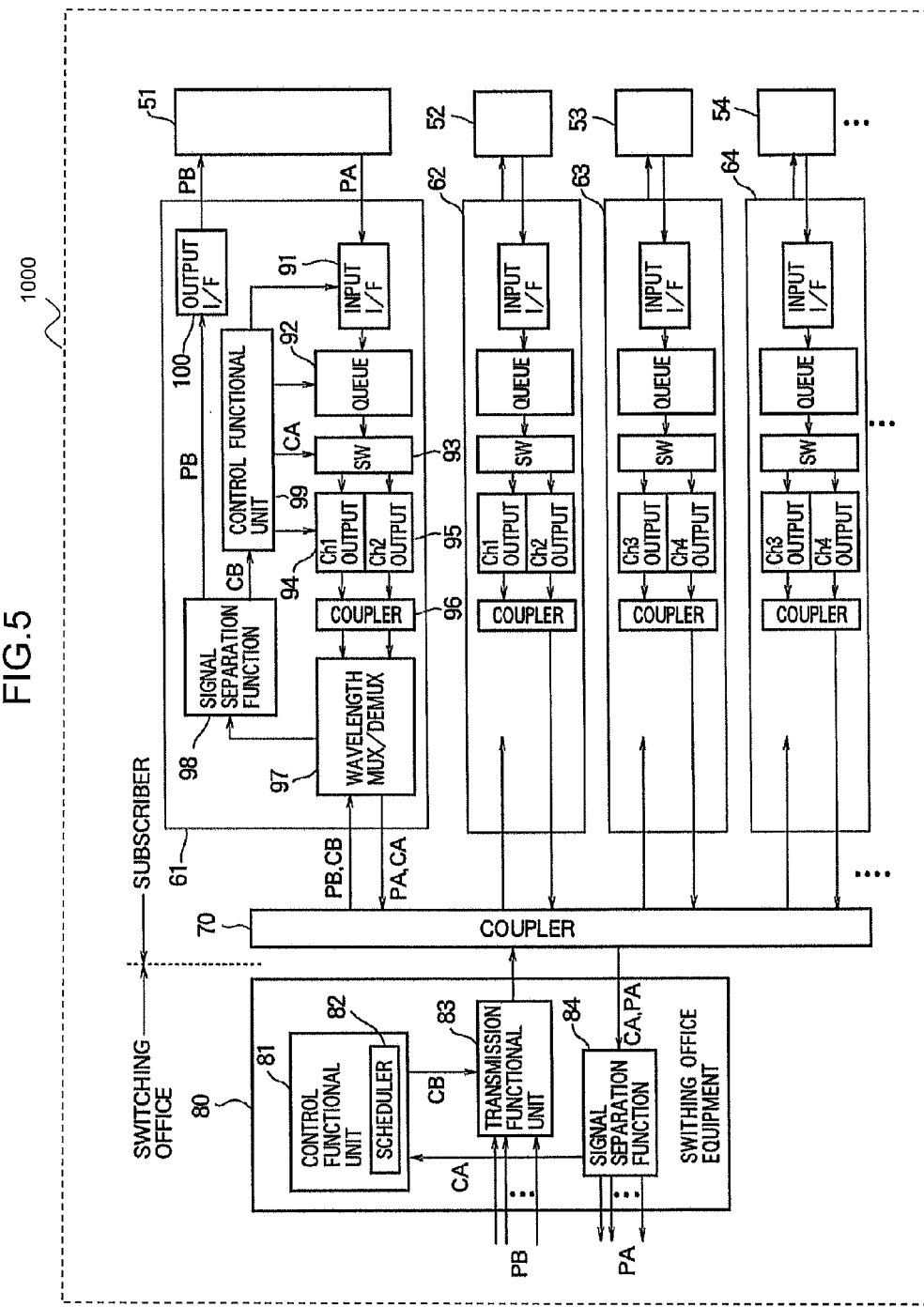
FIG. 5 is a block diagram schematically showing the structure of a dynamic bandwidth allocation device according to a first embodiment of the invention.

FIG. 5 is a block diagram schematically showing the structure of the dynamic bandwidth allocation device 1000 according to the first embodiment of the invention. FIG. 5 shows a system for transmitting information (traffic or packets) PA from a plurality of terminals (e.g., personal computers) 51, ..., 54 to switching office equipment 80 via subscriber devices (network units) 61, ..., 64 and a coupler (splitter) 70. The dynamic bandwidth allocation device 1000 according to the first embodiment includes the subscriber devices 61, ..., 64 and a control functional unit 81 in the switching office equipment 80 as its main components. The control functional unit 81 may be installed at one of the subscriber sites or in a control unit installed in a different location from the switching office equipment 80.

Each of the subscriber devices 61, ..., 64 includes an input I/F 91, a queue 92, a switch (SW) 93, a channel one (CH1) signal output unit 94, a channel two (CH2) signal output unit 94, a coupler 96, and a wavelength multiplexer/demultiplexer (MUX/DEMUX) 97. Each of the subscriber devices 61, ..., 64 also includes a signal separation functional unit 98, a control functional unit 99, and an output I/F 100. For example, packets PA output from terminal 51 are input to the switch 93 via the queue 92 and then to the CH1 signal output unit 94 or CH2 signal output unit 94, as selected by the switch 93, and the signal on the selected channel is transmitted through coupler 96 and the wavelength multiplexer/demultiplexer 97 to coupler 70. Coupler 70 also receives control data (packets including control data) CA generated in the control functional unit 99. Packets PB input to the wavelength multiplexer/demultiplexer 97 via the coupler (splitter) 70 and control data (packets including control data) CB are separated at the signal separation functional unit 98, and the packets PB are input to the control functional unit 99. The control functional unit 99 generates control data based on the control data CB and sends the generated data to the CH1 signal output unit 94, CH2 signal output unit 94, switch 93, queue 92, and input I/F 91.

The switching office equipment 80 includes the control functional unit 81, which includes a scheduler 82, a transmission functional unit 83, and a signal separation functional unit 84. Signals input to the signal separation functional unit 84 via the coupler 70 are separated into packets PA and control data CA; the packets PA are output and the control data CA are sent to the control functional unit 81. The transmission functional unit 83 receives packets PB, receives control data CB from the control functional unit 81; the packets PB and control data CB are input to the wavelength multiplexer/demultiplexer 97 via the coupler (splitter) 70. The other subscriber devices 62, 63, 64 have the same internal structure as this subscriber device. In FIG. 5, the internal structure of the subscriber devices 62, 63, 64 is partially omitted, however. Signals from the other terminals 52, 53, 54 are transmitted in the same way as signals from terminal 51.

In the system shown in FIG. 5, each of the subscriber devices 61, ..., 64 sends a bandwidth request signal requesting bandwidth for transmitting packets to the switching office equipment 80 at least once (once in advance or a plurality of times; a bandwidth request may also be input manually from a subscriber device or a control unit); then the control functional unit 81 generates control data CB for permitting transmission in the minimum guaranteed bandwidth predetermined for each of the subscriber devices 61, ..., 64, and allocating available bandwidth to the subscriber devices 61, ..., 64 so that the bandwidth made available for packet transmission by each of the subscriber devices 61, ..., 64 is maximized (maximized according to a predetermined rule) while maintaining fairness, within the range of a maximum transmittable bandwidth obtained by subtracting the sum of the minimum guaranteed bandwidths of the plurality of the subscriber devices 61, ..., 64 from the bandwidth available to the entirety of the plurality of subscriber devices 61, ..., 64. Next, the control functional unit 81 transmits the control data CB to the subscriber devices 61, ..., 64, thereby notifying the subscriber devices 61, ..., 64 of the bandwidths in which they can transmit. Then the subscriber devices 61, ..., 64 transmit packets PA in the bandwidths permitted by the control functional unit 81.

The step that generates the control data CB is carried out by use of a plurality of pairs of a first information holding means and a second information holding means provided in the control functional unit 81 for each of the subscriber devices 61, ..., 64 (shown in FIG. 6 below), a third information holding means provided in common for the subscriber devices 61, ..., 64 (shown in FIG. 6 below), and a control means (shown in FIG. 6 below). Each of the first, second, and third information holding means has a function for output of a certain amount of information (tokens) from an output port at constant intervals and a function for output of overflow information or held information from an overflow output port when the amount of stored information exceeds a predetermined amount.

The step that generates the control data CB includes a step in which information responsive to the bandwidth request signal is input to the first information holding means; a step in which, in each of the pairs, constant amounts of information are output from the output port of the first information holding means at constant temporal intervals and the output information is input to the second information holding means; a step in which information is output from the overflow output port of the second information holding means in each of the pairs to the third information holding means; and a step in which the control functional unit 81 transmits control data based on the information output from the output port of the second information holding means and the information output form the output port of the third information holding means.

The control functional unit 81 includes, for example, a timing signal generation and output circuit for generating timings for the transmission of packets PA from the subscriber devices 61, ..., 64, and the control data CB includes information about transmission timings and transmission times of the packets PA.

The control functional unit 81 may include, for example, a means for determining at least one of the importance of the packets transmitted from the subscriber devices 61, ..., 64 and a permitted delay time, and a means for determining the transmission priorities of the packets PA to be transmitted from the subscriber devices 61, ..., 64 according to their packet importance and/or permitted delay time.

The control functional unit 81 may also include, for example, a means for deciding at least one of the importance of the packets transmitted from the subscriber devices 61, ..., 64 and their recoverability by error correction, and a means of discharging information from the overflow output ports of the first, second, and third information holding means on a priority basis in ascending order of the degrees of importance thus determined or descending order of the recoverability by error correction thus determined.

Figure 6:
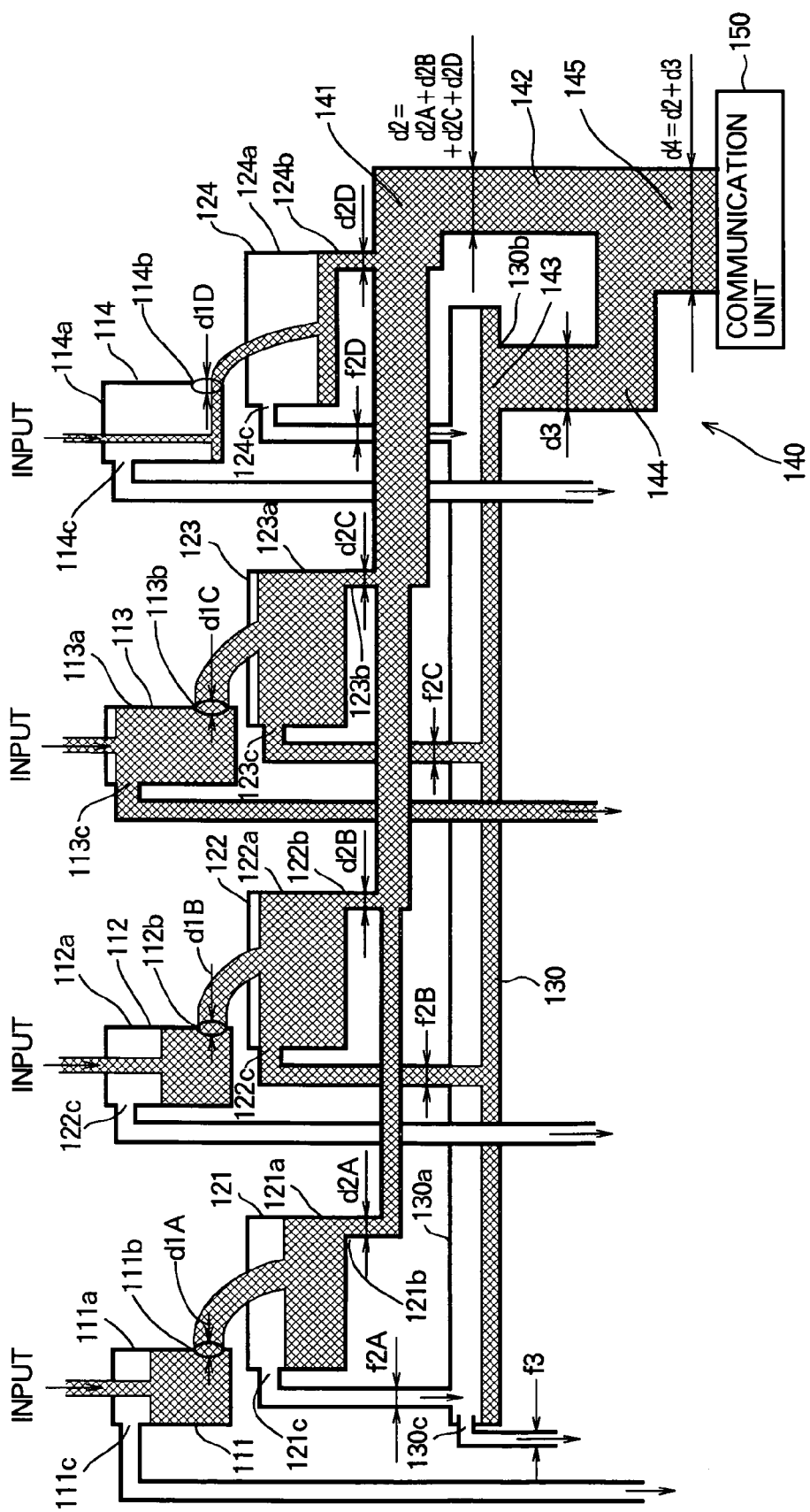
FIG. 6 illustrates the operation of the dynamic bandwidth allocation device according to the first embodiment of the invention by use of the leaky bucket algorithm.

FIG. 6 illustrates the operation of the dynamic bandwidth allocation device 1000 according to the first embodiment by use of the leaky bucket algorithm. FIG. 6 is a drawing illustrating the operation of the control functional unit 81 in FIG. 5 and corresponds to the configuration in FIG. 7, described later. FIG. 6 also corresponds to the operation of the subscriber devices 61, ..., 64 operating based on the control data CB generated by the control functional unit 81. In the first embodiment, however, the subscriber devices 61, ..., 64 use packet transmission timing and transmission time to allocate bandwidth to each channel. Accordingly, there is not a one-to-one correspondence between the configuration shown in FIG. 6 and the configurations of the subscriber devices 61, ..., 64 shown in FIG. 5. When the description given below with reference to FIG. 6 is used to describe the operation of the control functional unit 81 in FIG. 5, the information input to the 'leaky buckets' used as information holding means is tokens. When the description given below with reference to FIG. 6 is used to describe the operation of the subscriber devices 61, ..., 64 in FIG. 5, the information input to the 'leaky buckets' used as information holding means is the actual packets (traffic) flowing from the subscriber sites to the switching office site.

FIG. 6 includes an information holding means 101 (102, ..., 104) consisting of a first information holding means 111 (112, ..., 114) paired with a second information holding means 121 (122, ..., 124) as a configuration used for each of the subscribers #1, ..., #4, a third information holding means 130 provided as a configuration used for each of the subscribers, and an information merging means 140 provided as a common structure.

In FIG. 6, the information holding means are shown as 'leaky buckets', information (tokens in the description of the control functional unit 80, packets in the description of the subscriber devices 61, ..., 64) is shown as 'water', and the transferable bandwidths for information output from the information holding means are shown as the sizes of 'holes' in the 'leaky buckets'.

The dynamic bandwidth allocation device 1000 according to the first embodiment comprises first 'leaky buckets' (queues for limiting maximum bandwidths) 111, ..., 114, which are the first information holding means, provided for each of the corresponding subscriber terminals #1, ..., #4, second 'leaky buckets' (queues for guaranteeing minimum bandwidths) 121, ..., 124 provided for each of the corresponding subscriber terminals #1, ..., #4, a third 'leaky bucket' 130 shared by all the subscriber terminals #1, ..., #4, a first junction 141, a second junction 144, a first pipe connecting the first junction 141 and the second junction 144, a second pipe 143 connecting the third 'leaky bucket' 130 and the second junction 144, and a third pipe 145 from the first junction 141 to a communication unit 150. The first junction 141 and second junction 144 may be implemented as a single junction. The first junction 141, first pipe 142, second pipe 143, and second junction 144 constitute the information merging means 140 shown in FIG. 6.

The information that the subscribers want to transmit is input to the first 'leaky buckets' 111, ..., 114. The bottoms of the first 'leaky buckets' 111, ..., 114 have 'holes' 111b, ..., 114b of sizes d1A, d1B, d1C, d1D, configured to pour constant amounts of information into the second 'leaky buckets' 121, ..., 124. The sizes d1A, d1B, d1C, d1D of the bottom 'holes' 111b, ..., 114b indicate the maximum amounts of information transferable per unit time (transfer rate) to the second 'leaky buckets' 121, ..., 124 from the first 'leaky buckets' 111, ..., 114. The tops of the first 'leaky buckets' 111, ..., 114 have 'holes' 111c, ..., 114c through which overflow information flows (and is discarded in the first embodiment); these 'holes' have sizes large enough that the overflowing 'water' can be discarded therethrough no matter what the input may be. The sizes d1A, d1B, d1C, d1D of the bottom 'holes' 111b, ..., 114b may be mutually identical or may mutually differ.

The second 'leaky buckets' 121, ..., 124 also have top and bottom 'holes', configured so that 'water' to be output to the first junction 141 flows out of the bottom 'holes' 121b, ..., 124b and 'water' overflowing from the top 'holes' 121c, ..., 124c flows into the third 'leaky bucket' 130. The sizes d2A, d2B, d2C, d2D of the bottom 'holes' 121b, ..., 124b are equivalent to the minimum guaranteed bandwidths of the subscribers (terminals #1, ..., #4). The top 'holes' 121c, ..., 124c have sizes large enough for all the overflow 'water' to pass through and be output. The sizes d2A, d2B, d2C, d2D of the bottom 'holes' 121b, ..., 124b may be mutually identical or may mutually differ.

The third 'leaky bucket' 130 also has top and bottom 'holes', configured so that 'water' to be output to the second junction 144 flows out of the bottom 'hole' 130b and overflow 'water' flows out of the top 'hole' 130c (and is discarded, in the first embodiment). The bottom 'hole' 130b has a size d3. The size of the top 'hole' 130c is large enough for all the overflow 'water' to pass through and be output.

The 'water' flowing out of the bottom 'holes' 121b, ..., 124b of the second 'leaky buckets' 121, ..., 124 joins into a single flow at the first junction 141, passes through the first pipe 142, and flows into the second junction 144. The size d2 of the first pipe 142 below the first junction 141 is $$d2=d2A+d2B+d2C+d2D$$

(When there are further second 'leaky buckets', the size is $$d2=d2A+d2B+d2C+d2D+\ldots),$$

which is just the right size for the 'water' from the second 'leaky buckets' 121, ..., 124 to flow into the second junction 144. Accordingly, all the 'water' output from the bottom 'holes' of the second 'leaky buckets' 121, ..., 124 is always output to the second junction 144.

In this configuration, the 'water' from the bottom 'hole' 130b of the third 'leaky bucket' 130 and the 'water' from the first junction 141 join into a single flow at the second junction 144, then pass through the third pipe 145 and are input to a transmission device or an upstream communication unit 150, such as a router. If the size of the second pipe 143 from the third 'leaky bucket' 130 to the second junction 144 is d3, then the size d4 of the third pipe 145 from the second junction 144 to the communication unit 150 is (d2+d3), and this is equal to the transfer capability of the communication unit 150. Therefore, all the 'water' that has been input to the first junction 141 can be output from the communication unit 150. The size d3 of the second pipe 143 can be obtained as (d4−d2). This is the remaining bandwidth after the minimum guaranteed bandwidths of the subscribers are subtracted from the transfer capability of the communication unit 150. The minimum guaranteed bandwidths d2A, d2B, d2C, d2D of all the subscriber terminals are all input to the communication unit 150, and the remaining bandwidth is shared by all the subscribers.

Figure 7:
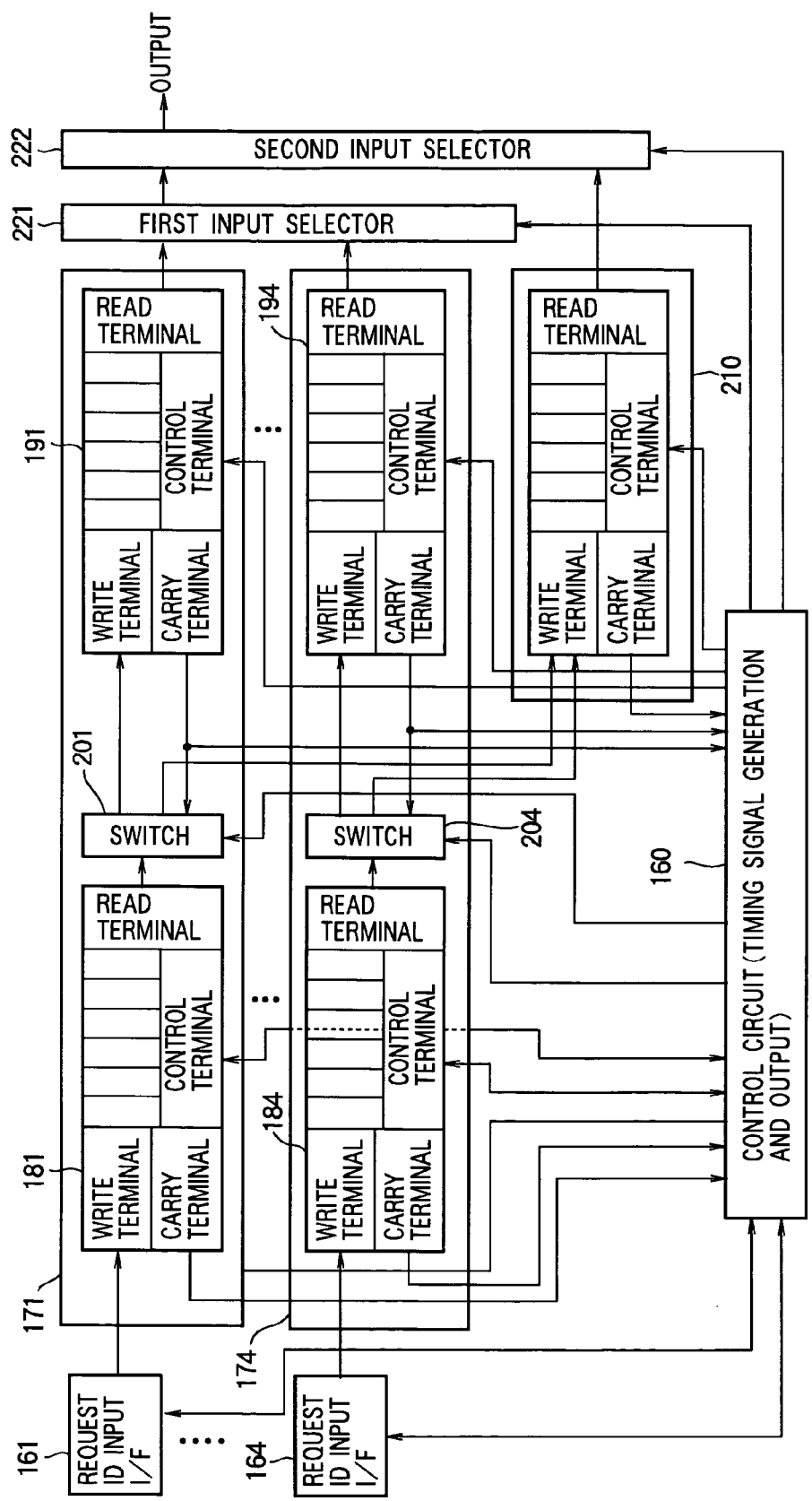
FIG. 7 is a block diagram schematically showing the structure of the timing signal generation and output unit of the dynamic bandwidth allocation device according to the first embodiment.

FIG. 7 is a block diagram schematically showing the structure of the control functional unit 81 in the switching office equipment 10 of the dynamic bandwidth allocation device 1000 according to the first embodiment. The control functional unit 81 can be configured as shown in FIG. 7 by means of, for example, electronic circuitry. The control functional unit 81, which is part of the switching office equipment 10, has a configuration corresponding functionally to the terminal units through which traffic actually flows, that is, the units that execute the bandwidth allocations, but no traffic flows through the control functional unit 81 in the switching office equipment 10.

The first 'leaky buckets' 111, . . . , 114 of the terminal equipment in FIG. 6 correspond to first FIFO memories 181, . . . , 184 in the switching office equipment in FIG. 7; the second 'leaky buckets' 121, . . . , 124 of the terminal equipment in FIG. 6 correspond to second FIFO memories 191, . . . , 194 in the switching office equipment in FIG. 7; the third 'leaky bucket' 130 of the terminal equipment in FIG. 6 corresponds to a third FIFO memory 210 in the switching office equipment in FIG. 7; the first and second junctions 141, 144 of the terminal equipment in FIG. 6 correspond to first and second input selectors 221, 222 in the switching office equipment in FIG. 7. The first and second input selectors 221, 222 may also be configured as a single input selector. Request ID input I/Fs 161, . . . , 164 and a control circuit (timing signal generation and output circuit) 160 use the FIFO memories and input selectors to output control data.

<<1-2>> Operation of the First Embodiment

In the configuration shown in FIG. 6, tokens indicating transmission requests from the subscribers are input from the tops of the first 'leaky buckets' 111, . . . , 114. If the tokens input from the tops of the first 'leaky buckets' 111, . . . , 114 are less than the declared peak rates (maximum transferable data rates) d1A, . . . , d1D, the tokens input to the first 'leaky buckets' 111, . . . , 114 pass through the bottom 'holes' 111b, . . . , 114b of the first 'leaky buckets' 111, . . . , 114 and are sent to the second 'leaky buckets' 121, . . . , 124. If a situation in which tokens are input from the tops of the first 'leaky buckets' 111, . . . , 114 in excess of the peak rates persists for a prolonged time, some of the tokens input to or held in the first 'leaky buckets' 111, . . . , 114 are discarded form the top 'holes' 111b, . . . , 114b of the first 'leaky buckets' 111, . . . , 114.

Among the tokens input to the second 'leaky buckets' 121, . . . , 124, tokens input at rates equal to or less than the minimum guaranteed bandwidths d2A, d2B, d2C, d2D all pass through the bottom 'holes' 121b, . . . , 124b, then through the first junction 141 and the second junction 144, and are sent to the communication unit 150. If a situation in which tokens are input from the tops of the second 'leaky buckets' 121, . . . , 124 in excess of the minimum guaranteed bandwidths persists for a prolonged time, some of the tokens input to the second 'leaky buckets' 121, . . . , 124 are sent through the top 'holes' 121c, . . . , 124c of the second 'leaky buckets' 121, . . . , 124 to the third 'leaky bucket' 130.

If the sum of the tokens sent from the subscribers to the third 'leaky bucket' 130 is less than the remaining bandwidth obtained by subtracting the minimum guaranteed bandwidths (the size of pipe 141) d2 from the transferable bandwidth (the size of the third pipe 145) d4 of the communication unit 150, that is, less than (d4−d2), the tokens are sent to the communication unit 150. Tokens exceeding this value are held for a given length of time, then discarded from the top 'hole' 130c of the third 'leaky bucket' 130.

It is possible to make two 'holes' at the tops of the second 'leaky buckets' 121, . . . , 124, one hole being connected to the third 'leaky bucket' 130, the other hole being used for discarding, and adjust the size of the former 'hole' thereby limiting the rate at which tokens can be sent in the remaining bandwidth. This configuration is equivalent to a configuration obtained by removing the flowmeter from FIG. 11, described below.

Next, the operation of the devices on the terminal side when controlled by the control functional unit 81 shown in FIG. 7, for example, will be described. The device in FIG. 7 is switching office equipment installed at the switching office. No actual user packets flow through the device in FIG. 7. The device in FIG. 7 is a device that, when given a request (request ID) for bandwidth declared by a subscriber in response to a bandwidth query from the switching office equipment, decides whether or not to permit transmission, and notifies the subscriber terminal of the result.

The request IDs from the subscribers received through the request ID input I/Fs 161, . . . , 164 in FIG. 7 are input to the first FIFO memories (referred to as 'FIFOs' below) 181, . . . , 184 from their write terminals. Here, one request ID indicates a fixed length of bandwidth. It will be appreciated that instead of this configuration, a method may be used in which variable-length bandwidth information is stored and the sum thereof is calculated.

If there is a request ID already stored in the first FIFO 181, . . . , 184, the request ID just written is stored at the tail end (the storage position next to the already stored request ID); if there is no already stored request ID, the request ID just written is stored at the top storage position in the first FIFO. The control circuit 160 transfers the request ID stored at the top storage position in the first FIFO 181, . . . , 184 via the switch 201, . . . , 204 to the tail end (the storage position next to the already stored request ID) of the second FIFO 191, . . . , 194, erases the transferred data from within the first FIFO 181, . . . , 184, and shifts the subsequent data forward by one position. Now, the information (bytes) indicated by {transfer period (transfers/sec.)}×{one request ID} represents the maximum accommodatable bandwidth. If the second FIFO 191, . . . , 194 is full, however, a carry signal is sent from the second FIFO 191, . . . , 194 to the first FIFO 181, . . . , 184 and the control circuit 160, and in this case, there is no transfer into the first FIFO memory 181, . . . , 184. The leading request ID is read out periodically from the second FIFO memory 191, . . . , 194, likewise according to the control data from the control circuit 160, and output via the first and second input selector circuits 221, 222. The output request ID is sent to the subscriber devices (61, . . . , 64 in FIG. 5), and the information corresponding to the request ID becomes transmittable and is transmitted from the terminal to the switching office equipment. The minimum guaranteed bandwidth is:

{transfer period from second FIFO to input selectors (transfers/sec.)}×{traffic (bytes) indicated by one request ID}

If the first FIFOs 181, . . . , 184 are large, the second FIFOs 191, . . . , 194 fill up first and send carry signals to the first FIFOs 181, . . . , 184, and the request IDs transferable to the second FIFO 191, . . . , 194 become equal to the minimum guaranteed bandwidth read out from the first FIFOs 181, . . . , 184. In time, the first FIFOs 181, . . . , 184 also fill up, and when they are on the brink of overflow, carry signals are sent to the control circuit and the leading request IDs are sent to the third FIFO 210. The rate at which request IDs are read into the third FIFO 210 may be determined on the basis of an operation policy of the system administer: the same rate may be used for all subscribers, or higher rates may be allocated to subscriber devices that have declared larger minimum guaranteed bandwidths, etc. The third FIFO 210 is shared by all the subscriber devices and may already be filled with request IDs from other subscriber devices. When the third FIFO 210 also becomes full, a carry signal is sent to the first FIFOs 181, . . . , 184 for all the subscriber devices, and if the first FIFOs 181, . . . , 184 are full and can accept no more request IDs, the control circuit 160 decides to reject the bandwidth request. The rejected request ID cannot, of course, be input to the FIFO. The rate of information output from the third FIFO 210 via the second input selector 222 is {total bandwidth}−{Σ(minimum guaranteed bandwidths of all subscriber devices)}.

<<1-3>> Effects of the First Embodiment

If the dynamic bandwidth allocation method or dynamic bandwidth allocation device 1000 according to the first embodiment is used, a simple structure enables a bandwidth in which subscribers desire to transmit to be allocated to carry out communication with specified minimum guaranteed bandwidths and specified maximum accommodatable bandwidths as described above. The subscribers become able to use the capability of the shared transmission medium without waste.

<<1-4>> Variations of the First Embodiment

In the above description, the dynamic bandwidth allocation device 1000 has been described as being configured from electronic circuitry as shown in FIG. 7, but it may be implemented partially or entirely by use of software on a computer. This is also applicable to the second and subsequent embodiments described below.

The above description has assumed that the tokens sent from the second 'leaky buckets' to the third 'leaky bucket' or the tokens discarded from the first 'leaky buckets' and the third 'leaky bucket' are the last tokens to have entered the 'leaky buckets (queues)'. It is also possible, however, to employ methods in which the tokens to be discarded are selected according to characteristics of the packets to be transmitted. A specific method is to select the tokens to be discarded and the tokens to be sent to the next stage from the tokens that have entered the 'leaky buckets (queues)' according to the priorities of the tokens, in order to reduce transfer delay time.

Another method is to select and discard data to which FEC (forward error correction) has been applied, because there is a possibility that data to which FEC has been applied can be recovered.

Still another method of deciding which tokens to discard is to use random numbers so that the tokens discarded will not be concentrated on a certain destination.

As yet another method, the traffic to be discarded may be decided according to its degree of importance.

The token discarding methods described above (traffic discarding methods in the subscriber devices) are also applicable to all the examples below.

Figure 8:
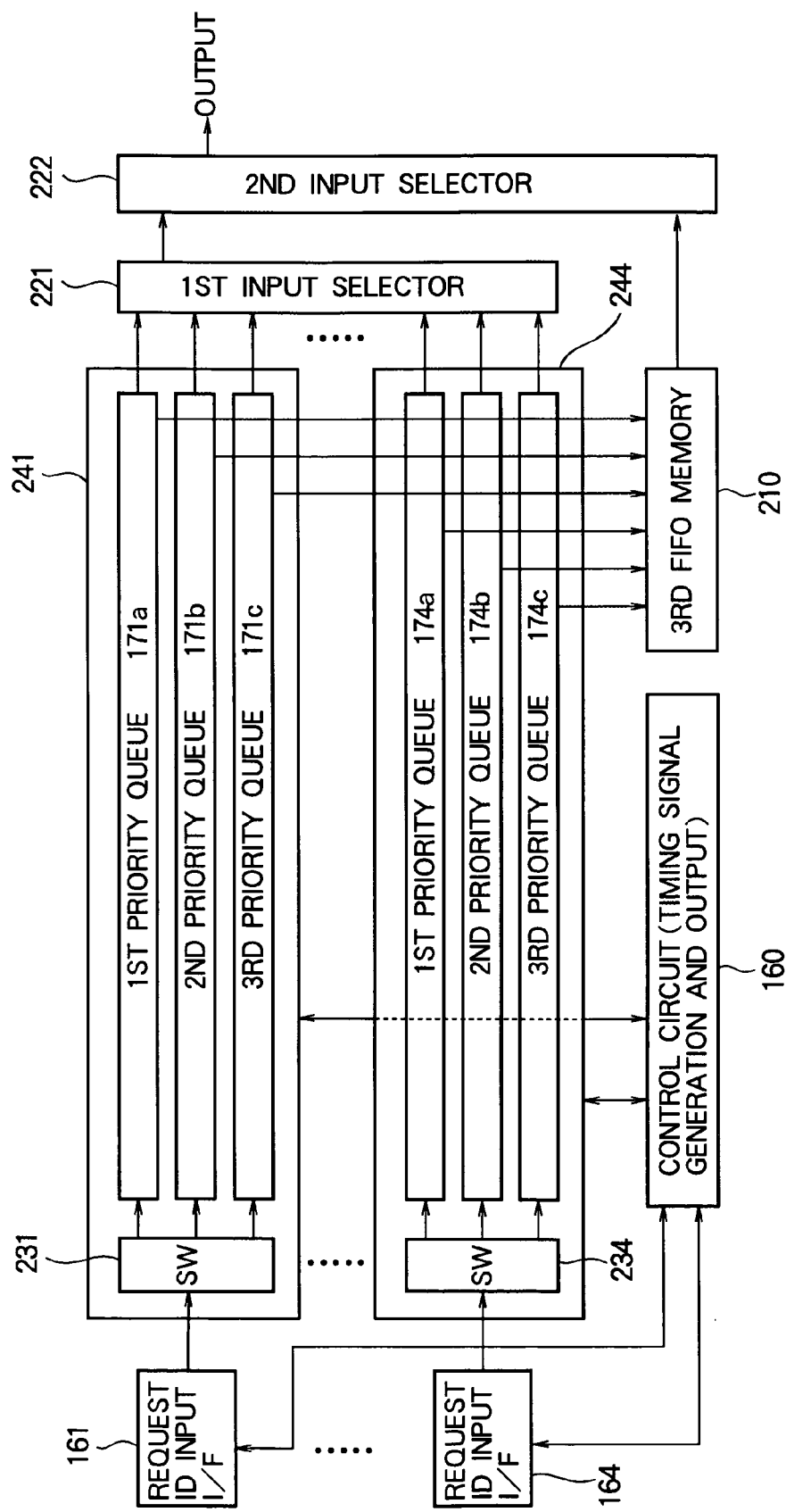
FIG. 8 is a block diagram schematically illustrating the structure of the timing signal generation and output unit of the dynamic bandwidth allocation device according to a variation of the first embodiment.

FIG. 8 is a block diagram schematically illustrating the structure of the timing signal generation and output unit of the dynamic bandwidth allocation device according to a variation of the first embodiment. The structure shown in FIG. 8 is a variation of the structure already described in FIG. 7. Elements in FIG. 8 that are identical to or correspond to elements in FIG. 7 have the same reference characters. FIG. 8 is an example of a structure in which there are plural priority classes of packets. The first subscriber circuit 241 in FIG. 8 has first to third priority queue circuits 171a, 171b, 171c (a plurality of means provided in correspondence to packet priority); the fourth subscriber circuit 244 has first to third priority queue circuits 174a, 174b, 174c. The other subscriber circuits have similar structures (not shown). The first to third priority queues are shown in descending priority order. Each of the first to third priority queue circuits is provided with structures equivalent to the subscriber circuit 171 and other structures shown in FIG. 7. Each of the subscriber circuits 241, . . . , 244 is thus provided with a plurality of priority queues, selected by switches 231, . . . , 234, and output via the selectors 221, 222 is read in order from the highest-priority queue with, in one method, a structure that provide for different numbers of reads by the selectors according to the priorities of the priority queues. FIG. 8 shows lines representing the flow of information (tokens, in FIG. 7), but does not indicate control data. The flow of control data is arranged as in FIG. 7.

The first and second selectors 221, 222 are not absolutely necessary; a structure in which the information from the read terminals of the second and third FIFO memories is used directly may be adopted. The selectors (or switches) 221, 222 may have a plurality of outputs to the circuit that allocates transmission channels and transmission timings. The transmission channel and timing allocation circuit may be implemented by use of the fourth embodiment, described below.

<<2>> Second Embodiment 2-1>> Structure of the Second Embodiment

In its overall structure, the dynamic bandwidth allocation device according to the second embodiment of the invention is similar to the dynamic bandwidth allocation device 1000 according to the first embodiment, so FIG. 5 will also be referred to in the description of the second embodiment.

Figure 9:
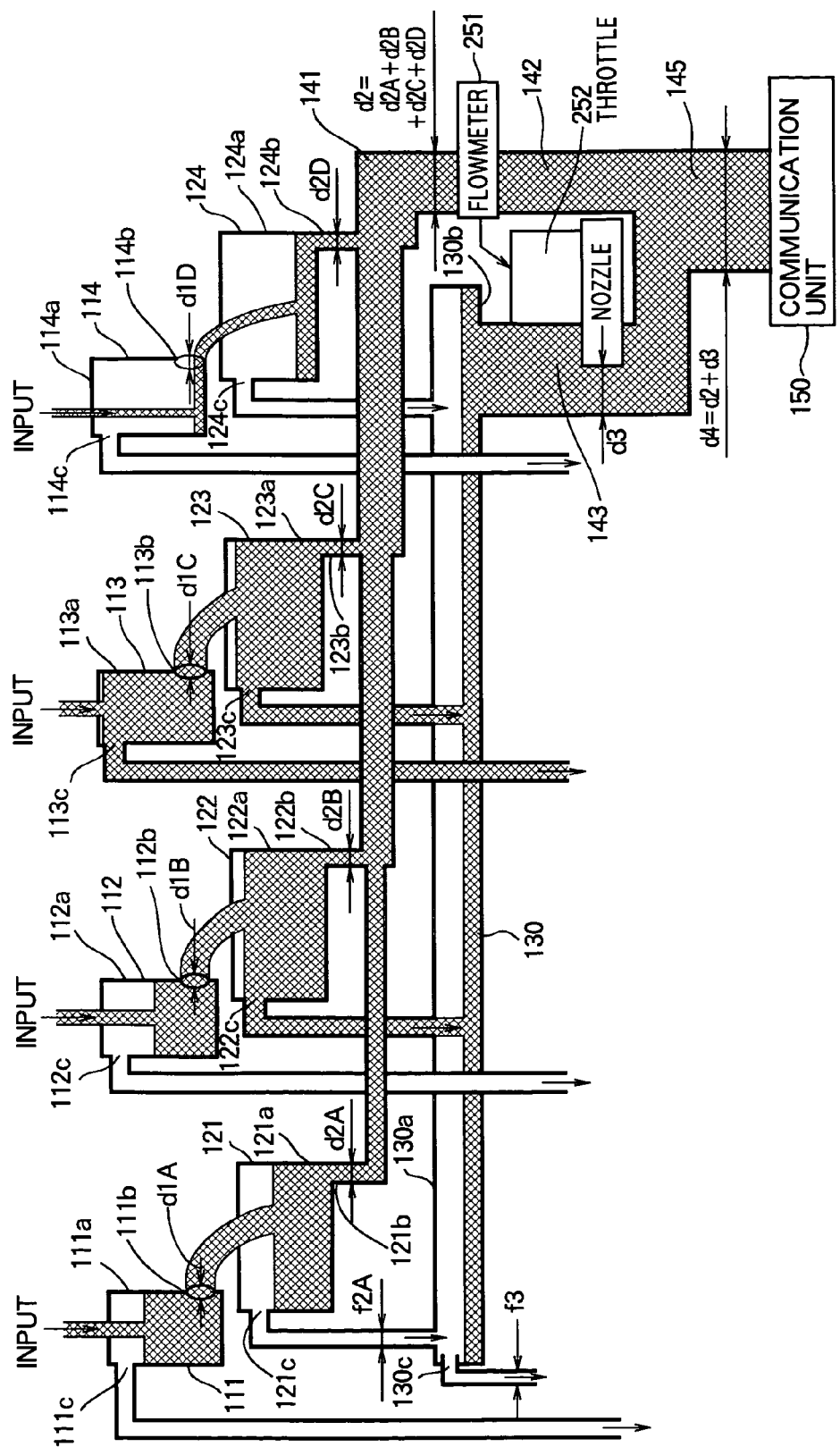
FIG. 9 illustrates the operation of a dynamic bandwidth allocation device according to a second embodiment of the invention by use of the leaky bucket algorithm.

FIG. 9 illustrates the operation of the dynamic bandwidth allocation device 1000 according to the second embodiment of the invention by use of the leaky bucket algorithm. Elements in FIG. 9 that are identical to or correspond to elements in FIG. 6 (the first embodiment) have the same reference characters. In the structure of the second embodiment, a flowmeter 251 is installed in the first pipe 142 joining the first junction 141 and the second junction 144, and a throttle 252 is installed in the second pipe 143 joining the third 'leaky bucket' 130 and the second junction 144. In this structure, flow information measured by the flowmeter 251, or control data based on the flow information, is sent to the throttle 252.

Figure 10:
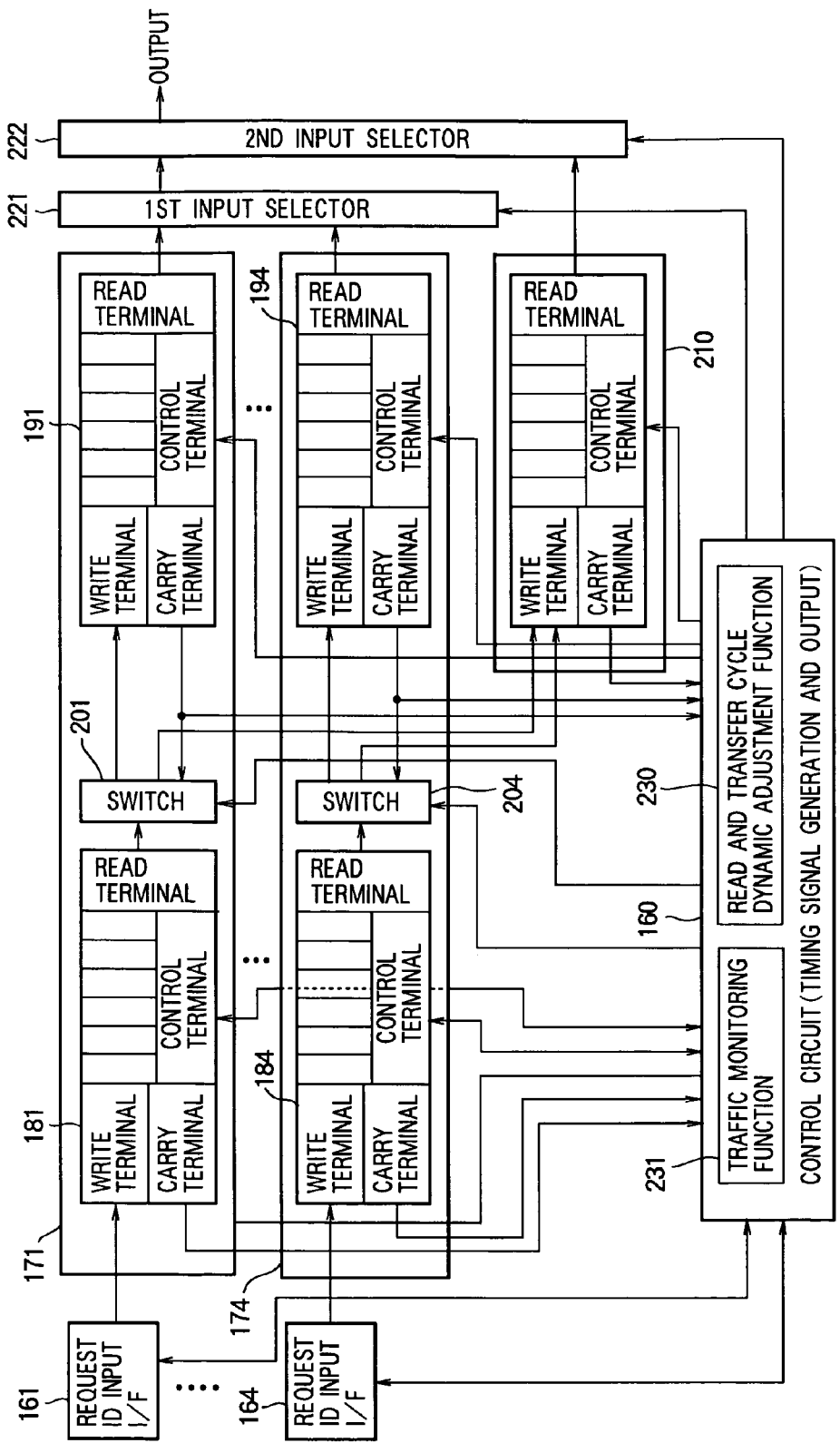
FIG. 10 is a block diagram schematically illustrating the structure of the timing signal generation and output unit of the dynamic bandwidth allocation device according to the second embodiment.

The structural model in FIG. 9 can be implemented by the electronic circuit shown in FIG. 10. In the structure in FIG. 10, tokens (traffic information) input to the request ID input I/Fs 161, . . . , 164 are sent to the traffic monitoring functional unit 231 in the control circuit 160, which functions as the flowmeter 251 in FIG. 9 by monitoring traffic. The timing of the reading and transferring of information from the second FIFO memories 191, . . . , 194 and third FIFO memory 210 by the input selectors 221, 222 is controlled by the read and transfer cycle dynamic adjustment functional unit 230, which has the function of nozzle diameter adjustment of the throttle 252.

<<2-2>> Operation of the Second Embodiment

In the second embodiment, the flow of information on the first pipe 142 to guarantee the minimum guaranteed bandwidth is measured by the flowmeter 251, and information thereasto is sent to the throttle 252. If the information flowing through the first pipe 142 falls short of the set minimum guaranteed bandwidth, the difference is regarded as excess bandwidth, and the nozzle of the throttle 252 installed on the second pipe 143 is opened by that amount. The nozzle diameter of the throttle 252 is adjusted so that (flow of information through first pipe 142)+(flow of information through second pipe 143)

is always equal to or less than the transmittable bandwidth d4 of the communication apparatus.

The operations illustrated in FIGS. 9 and 10 have been described as operations of the control functional unit 80 in the switching office equipment, but the operation of transmitting packets (traffic) from the subscriber devices 61, . . . , 64 to the switching office equipment may be carried out similarly on the basis of control data CB from the control functional unit 80.

<<2-3>> Effect of the Second Embodiment

If the dynamic bandwidth allocation method and dynamic bandwidth allocation device 1000 according to the second embodiment are used, then in addition of the effects of the first embodiment, when the subscriber devices' transmission bandwidth is less than the minimum guaranteed bandwidth, packets can be transferred more efficiently because the vacant bandwidth arising as the difference from the minimum guaranteed bandwidth can be used, as described above.

<<2-4>> Variations of the Second Embodiment

Normally a delay, even if only slight, occurs from the observation of the information flow rate by the flowmeter 251 and the changing of the nozzle aperture by the throttle 252. After the flowmeter 251 observes an increase in the flow rate, it is possible that even if the throttle 252 quickly reduces the nozzle aperture, it may not be in time to prevent a delay in the transfer of tokens in the guaranteed minimum bandwidth.

A method of preventing this is, for example, for the throttle 252 to open the nozzle by a conservative amount, so that even if there is a delay, as far as possible, information that would interfere with the flow rate in the first pipe 142 will not flow in the second pipe 143.

Another method is to configure the device to perform an operation that throttles down the nozzle aperture further than {d4−(volume of flow in first pipe 142)} for the amount by which the throttle 252 fails to reduce the nozzle aperture in time, and then to perform an operation that resets the pipe aperture d3, which was throttled down by the nozzle, to {d4−(volume of flow in first pipe 142)}.

Figure 11:
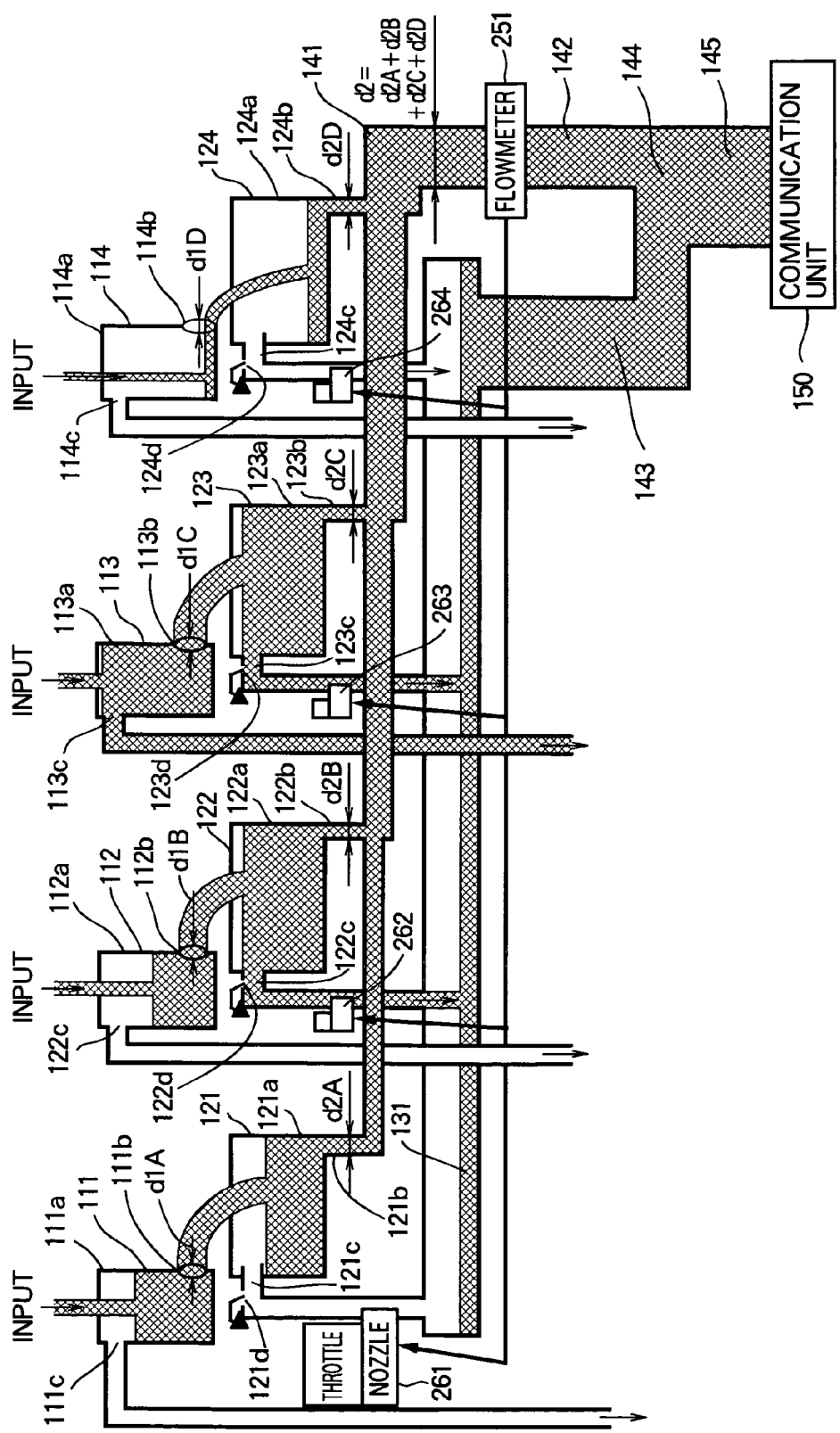
FIG. 11 illustrates the operation of a dynamic bandwidth allocation device according to a variation of the second embodiment of the invention by use of the leaky bucket algorithm.

FIG. 11 illustrates the operation of the dynamic bandwidth allocation device 1000 according to a variation of the second embodiment of the invention by use of the leaky bucket algorithm. Elements in FIG. 11 that are identical to or correspond to elements in FIG. 9 have the same reference characters. As shown in FIG. 11, in the dynamic bandwidth allocation device 1000 in FIG. 11, the differences from FIG. 9 are that the second information holding means 121, . . . , 124 have other overflow holes 121d, . . . , 124d, and instead of the throttle 252, there are throttles 261, . . . , 264 that change the maximum amount of information passage from the second information holding means 121, . . . , 124 to the third information holding means 131 responsive to the value measured by the flowmeter 251. The same effects can be obtained from FIG. 11 as from FIG. 9. In this system, the traffic that overflows the second 'leaky buckets' is not sent to the second junction through the third 'leaky bucket', but a throttle is placed in each pipe to adjust the pipe aperture, and overflowing traffic is simply discarded. A different excess bandwidth usage priority can thus be provided for each user.

Aside from the above points, the second embodiment is identical to the first embodiment.

<<3>> Third Embodiment

<<3-1>> Structure of the Third Embodiment

In its overall structure, the dynamic bandwidth allocation device 1000 according to the third embodiment of the invention is similar to the dynamic bandwidth allocation device 1000 according to the first embodiment, so FIG. 5 will also be referred to in the description of the third embodiment.

Figure 12:
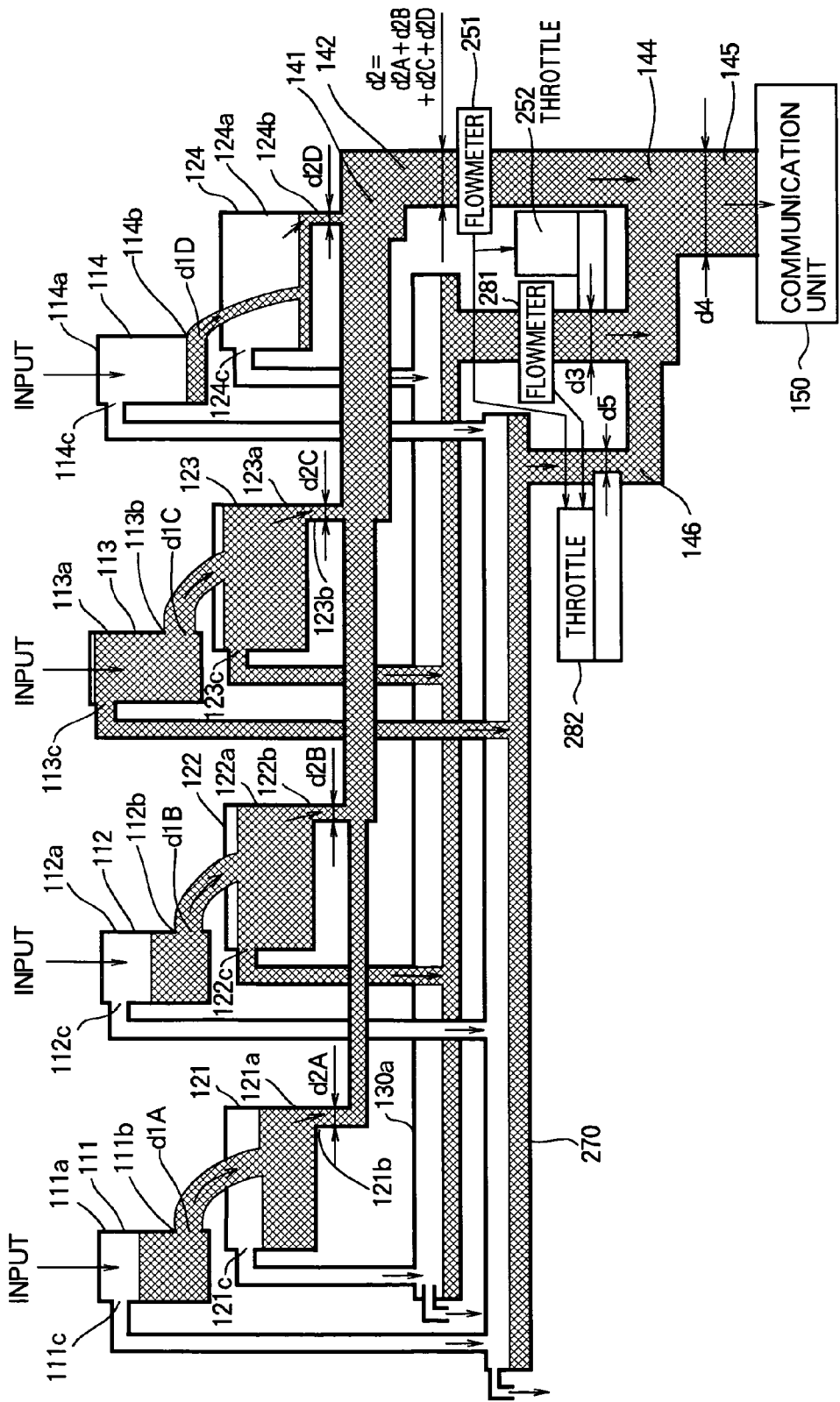
FIG. 12 illustrates the operation of a dynamic bandwidth allocation device according to a third embodiment of the invention by use of the leaky bucket algorithm.

FIG. 12 illustrates the operation of the dynamic bandwidth allocation device 1000 according to the third embodiment of the invention by use of the leaky bucket algorithm. Elements in FIG. 12 that are identical to or correspond to elements in FIG. 9 have the same reference characters. In the structure of the third embodiment, a flowmeter 251 is installed in the first pipe 142 joining the first junction 141 and second junction 144, and a throttle 252 is installed in the second pipe 143 joining the third 'leaky bucket' 130 and second junction 144. In this structure, flow information measured by the flowmeter 251, or control data based on the flow information, is sent to the throttle 252. A flowmeter 281 is also installed in the second pipe joining the third 'leaky bucket' 130 and the second junction 144, and a throttle 282 is installed in the pipe joining the fourth 'leaky bucket' 280 and the second junction 144. In this structure, flow information measured by flowmeter 281, or control data based on the flow information, is sent to throttle 282.

In the third embodiment, tokens discarded from the overflow 'holes' provided at the top of the first 'leaky buckets' 111, . . . , 114 and the third 'leaky bucket' 130 are routed into the fourth 'leaky bucket' 270, an output 'hole' is provided at the bottom of the fourth 'leaky bucket' 270, and the output therefrom is routed through a fourth pipe 146 to the second junction 144. In addition to the flowmeter 251 installed in the first pipe 142, a flowmeter 281 is installed in the second pipe, and in addition to the throttle 252 installed in the second pipe, a throttle 282 is installed in the fourth pipe 146.

Figure 13:
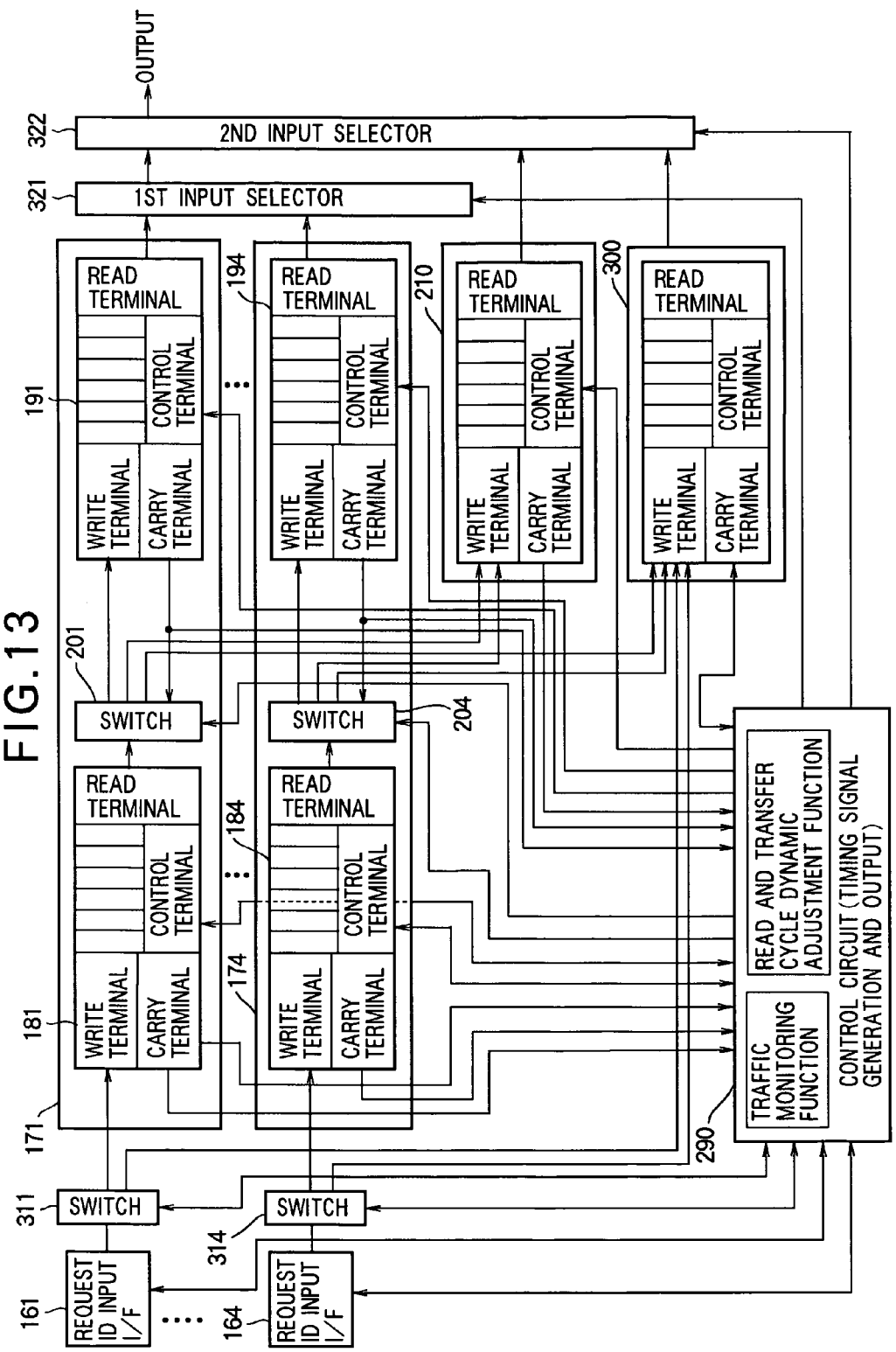
FIG. 13 is a block diagram schematically showing the structure of the timing signal generation and output unit of the dynamic bandwidth allocation device according to the third embodiment.

When the above structural model is implemented in an electronic circuit, the switching office structure shown in FIG. 13, for example, is adopted. Specifically, in addition to the structure of the second embodiment, a fourth FIFO memory equivalent to the fourth 'leaky bucket' 270 is implemented, switches are added on the input sides of the first FIFO memories and additional outputs are provided in the switches on the output sides of the first FIFO memories, leading to the fourth FIFO memory, to transfer information that overflows the first and third FIFO memories into the fourth FIFO memory.

<<3-2>> Operation of the Third Embodiment

The operation of the above model of the third embodiment is based on the operation of the second embodiment, but adds the following operations. The nozzle of throttle 282 is normally closed. Accordingly, the inflow of tokens from the first 'leaky buckets' 111, . . . , 114 and the third 'leaky bucket' 130 is normally discarded. If the sum of the flow of tokens in the first pipe 142 and the second pipe is less than the maximum transmittable bandwidth d4, however, the nozzle aperture of throttle 282 is enlarged within a range such that the traffic inflow to the second junction 144 is equal to or less than d4. In the operation of this model, the timing of reading and transferring from the memory is controlled by the read and transfer cycle dynamic adjustment function, based on traffic information measured by the request ID input I/F units and compiled by the traffic measuring unit, as in the second embodiment, and when request IDs are about to overflow the first and third FIFO memories and be lost, a command is given for the operation of saving them by transferring them to the fourth FIFO memory.

<<3-3>> Effect of the Third Embodiment

If the dynamic bandwidth allocation method and dynamic bandwidth allocation device 1000 according to the third embodiment are used, then in addition of the effects of the first and second embodiments, information that would conventionally be discarded can be used instead of being discarded. A similar effect could be obtained by enlarging the size of the first 'leaky buckets', but it would be necessary to enlarge all of the first 'leaky buckets' (queues), with the disadvantage that memory would be used less efficiently. The third embodiment enables the same remedy to be achieved with smaller queues.

Aside from the above points, the third embodiment is identical to the first and second embodiments.

<<4>> Fourth Embodiment 4-1>> Structure of the Fourth Embodiment

Figure 14:
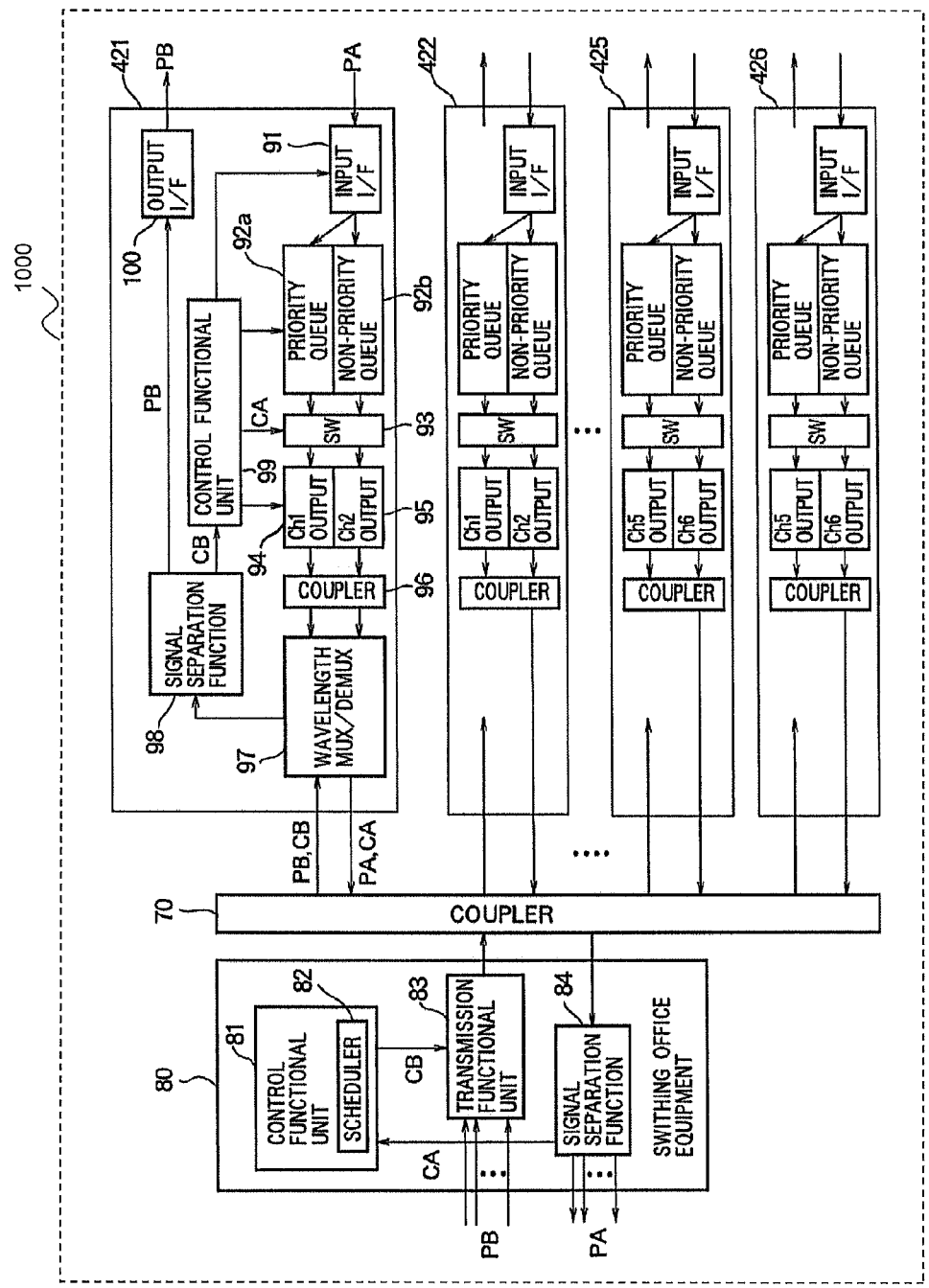
FIG. 14 is a block diagram schematically showing the structure of a dynamic bandwidth allocation device in a comparative example.
Figure 15:
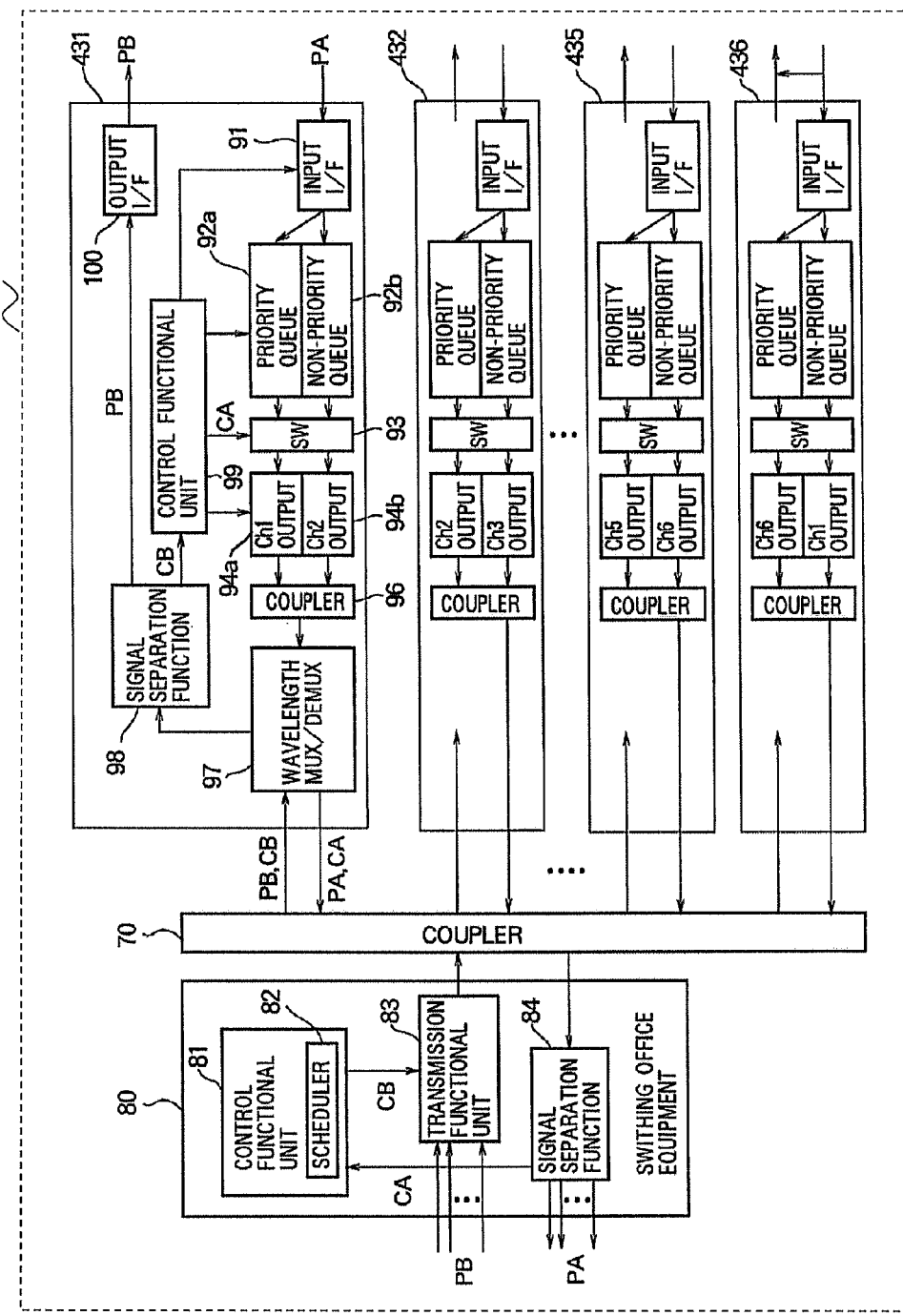
FIG. 15 is a block diagram schematically showing the structure of a dynamic bandwidth allocation device according to a fourth embodiment.

FIG. 14 is a block diagram schematically showing the structure of the dynamic bandwidth allocation device 1000 in a comparative example; FIG. 15 is a block diagram schematically showing the structure of the dynamic bandwidth allocation device 1000 according to a fourth embodiment of the present invention. Elements in FIGS. 14 and 15 that are identical to or correspond to elements in FIG. 5 (the first embodiment) have the same reference characters.

The systems shown in FIGS. 14 and 15 transmit information (traffic or packets) PA from a plurality of terminals (not shown) through subscriber devices (network units) 421, ..., 426 or 431, ..., 436 and a coupler (splitter) 70 to switching office equipment 80.

Each of the subscriber devices 421, ..., 426 in the comparative example shown in FIG. 14 includes an input I/F 91, a priority queue 92*a*, a non-priority queue 92*b*, a switch (SW) 93, a channel one (CH1) signal output unit 94, a channel two (CH2) signal output unit 95, a coupler 96, a wavelength multiplexer/demultiplexer 97, a signal separation functional unit 98, a control functional unit 99, and an output I/F 100. Each of the subscriber devices 431, ..., 436 in the fourth embodiment shown in FIG. 15 includes an input I/F 91, a priority queue 92*a*, a non-priority queue 92*b*, a switch (SW) 93, a channel one (CH1) signal output unit 94*a*, a channel two (CH2) signal output unit 95*a*, a coupler 96, a wavelength multiplexer/demultiplexer 97, a signal separation functional unit 98, a control functional unit 99, and an output I/F 100. The priority queue 92*a* and non-priority queue 92*b* may be a single queue 92 as shown in FIG. 5.

As shown in FIG. 14, of the plurality of subscriber devices (six devices in FIG. 14) in the comparative example, the first and second subscriber devices 421, 422 have queues 92*a*, 92*b* for holding packets and a first channel (the CH1 signal output unit) and a second channel (the CH2 signal output unit) as channels for transmitting packets output from queue 92*a* or 92*b*; the third and fourth subscriber devices have queues 92*a*, 92*b* for holding packets and a third channel (the CH3 signal output unit) and a fourth channel (the CH4 signal output unit) as channels for transmitting packets output from queue 92*a* or 92*b*; and the fifth and sixth subscriber devices 425, 426 have queues 92*a*, 92*b* for holding packets and a fifth channel (the CH5 signal output unit) and a sixth channel (the CH6 signal output unit) as channels for transmitting packets output from queue 92*a* or 92*b*.

In the comparative example in FIG. 14, a signal sent from a subscriber device to the switching office first enters the device from the input interface (input I/F) 91. Next, in the input interface 91, whether the input packet should be given priority or not is determined, and the packet is sent to the priority queue 92*a* if it is to be given priority, or to the non-priority queue 92*b* if it is not to be given priority.

The packets input to the priority queue 92*a* or non-priority queue 92*b* are read out sequentially at output timings, pass through the switch (SW) 93, and are output from the CH1 signal output unit 94 or CH2 signal output unit 95. The important point here is that the x-th subscriber device and the (x+1)-th subscriber device share the x-th channel and the (x+1)-th channel (where x is an odd number). For example, at a timing for transmission in the minimum guaranteed bandwidth, the first subscriber device outputs one packet from the CH1 signal output unit 94, and the second subscriber device outputs one packet from the CH2 signal output unit 94. At a timing not used for the minimum guaranteed bandwidth, however, if there are a plurality of packets to be transmitted in the first subscriber device and there are no packets to be transmitted in the second subscriber device, the first subscriber device reads two packets from the priority queue 92*a* or non-priority queue 92*b* or both and transmits the two packets simultaneously from the CH1 signal output unit 94 and the CH2 signal output unit 94 through the coupler 96 and wavelength multiplexer/demultiplexer 97, while no transmission is made from the second subscriber device. This prevents bandwidth from being wasted because the second subscriber device does not transmit. The transmitted packets may be taken first from the priority queue 92*a* and then, when there are no packets in the priority queue 92*a*, from the non-priority queue 92*b*; this type of control is preferable.

In the fourth embodiment, in contrast, as shown in FIG. 15, of the plurality of subscriber devices (six devices are shown in FIG. 15, but there may be any number of devices equal to or greater than three), the k-th subscriber device (where k is an integer from 1 to N and N is an integer equal to or greater than three) has queues 92*a* or 92*b* for holding packets and, as channels for transmitting packets output from queue 92*a* or 92*b*, a k-th channel signal output unit 94*a* and a (k+1)-th channel signal output unit 95*a*; the k-th subscriber device in the interval from the first to the (N−1)-th has means (a switch 93) for selecting, on the basis of control data, either the k-th channel or the (k+1)-th channel as the channel on which to transmit the packets; the N-th subscriber device has means for selecting, on the basis of control data, either the N-th channel or the first channel as the channel on which to transmit the packets. The case in which N=6 is shown in FIG. 15, but N may have another value. The structure of the fourth embodiment is thus similar to the structure of the comparative example, but the channels on which subscriber x can transmit are the CHx signal output unit and the CH(x+1) signal output unit. Subscriber N (N=6), however, transmits on the CH(N) signal output unit and the CH1 signal output unit. The transmittable channels are thereby allocated cyclically in steps of one channel.

In FIG. 15, a packet PA output from a terminal, for example, is input through queue 92a or 92b to the switch 93, and through the switch 93 to the CH1 signal output unit 94a or the CH2 signal output unit 95a, and the signals on the selected channel are sent through coupler 96 and the wavelength multiplexer/demultiplexer 97 to coupler 70. Control data CA generated by the control functional unit 99 are also input to coupler 70. Packets PB and control data CB input through coupler (splitter) 70 to the wavelength multiplexer/demultiplexer 97 are separated by the signal separation functional unit 98, and the packets PB are sent through the output I/F 100 to the terminal 51. The control data CB output from the signal separation functional unit 98 are input to the control functional unit 99. The control functional unit 99 generates control data according to control data CB, and sends the control data to the CH1 signal output unit 94a, CH2 signal output unit 95a, switch 93, queues 92a, 92b, and input I/F 91.

The switching office equipment 80 has a transmission functional unit 83, a signal separation functional unit 84, and a control functional unit 81 including a scheduler 82. A signal entering the signal separation functional unit 84 through the coupler 70 is separated into packets PA and control data CA, the packets PA are output, and the control data CA are sent to the control functional unit 81. Packets PB are input to the transmission functional unit 83 together with control data CB from the control functional unit 81, and the packets PB and control data CB are then input through the coupler (splitter) 70 to the wavelength multiplexer/demultiplexer 97. Part of the internal structure of subscriber devices 432 . . . is omitted in FIG. 15.

<<4-2>> Operation of the Fourth Embodiment

The operation of the fourth embodiment will be described with reference to FIG. 15. The control functional unit 81 in the switching office equipment 80 sends a requested bandwidth query signal to the subscriber devices. This signal is encoded in the transmission functional unit 83 in the code of the channel assigned to each subscriber device, and transmitted to the subscriber device temporally multiplexed with user data, which is similarly encoded. These downstream signals, bound for the subscriber devices, are distributed to the subscriber devices buy the coupler 70. These downstream signals are sent to the signal separation functional unit 98 by the wavelength multiplexer/demultiplexer 97, which is installed so that they are not transmitted toward the coupler that transmits the upstream signals. From among the incoming signals, the signal separation functional unit 98 selects the signals encoded in the code addressed to itself and separates them from the signals of other subscriber devices. Next it separates the control data CB from the user data PB and outputs the user data PB from the output I/F 100. The control data CB are sent to the control functional unit 99, which inputs a control packet indicating the queue status to the priority queue 92a. The control packet is sent together with user data to the switching office equipment 80, and after being separated according to subscriber device in the signal separation functional unit 84, the user packets PA are sent to an upstream communication unit while the control packets CA are sent to the switching office equipment 80. On the basis of the control packets sent from the subscriber devices, the scheduler 82 in the switching office equipment 80 calculates the timing at which and the channel on which to transmit the upstream packets from each subscriber device. The results of these calculations are stored in control packets CB and transmitted to the subscriber devices. On the basis of the information about the channels on which and timings at which to transmit, the subscriber devices operate their switches 93 and queues 92a, 92b and transmit upstream signals on the prescribed transmission channels at the prescribed timings.

Figure 16:
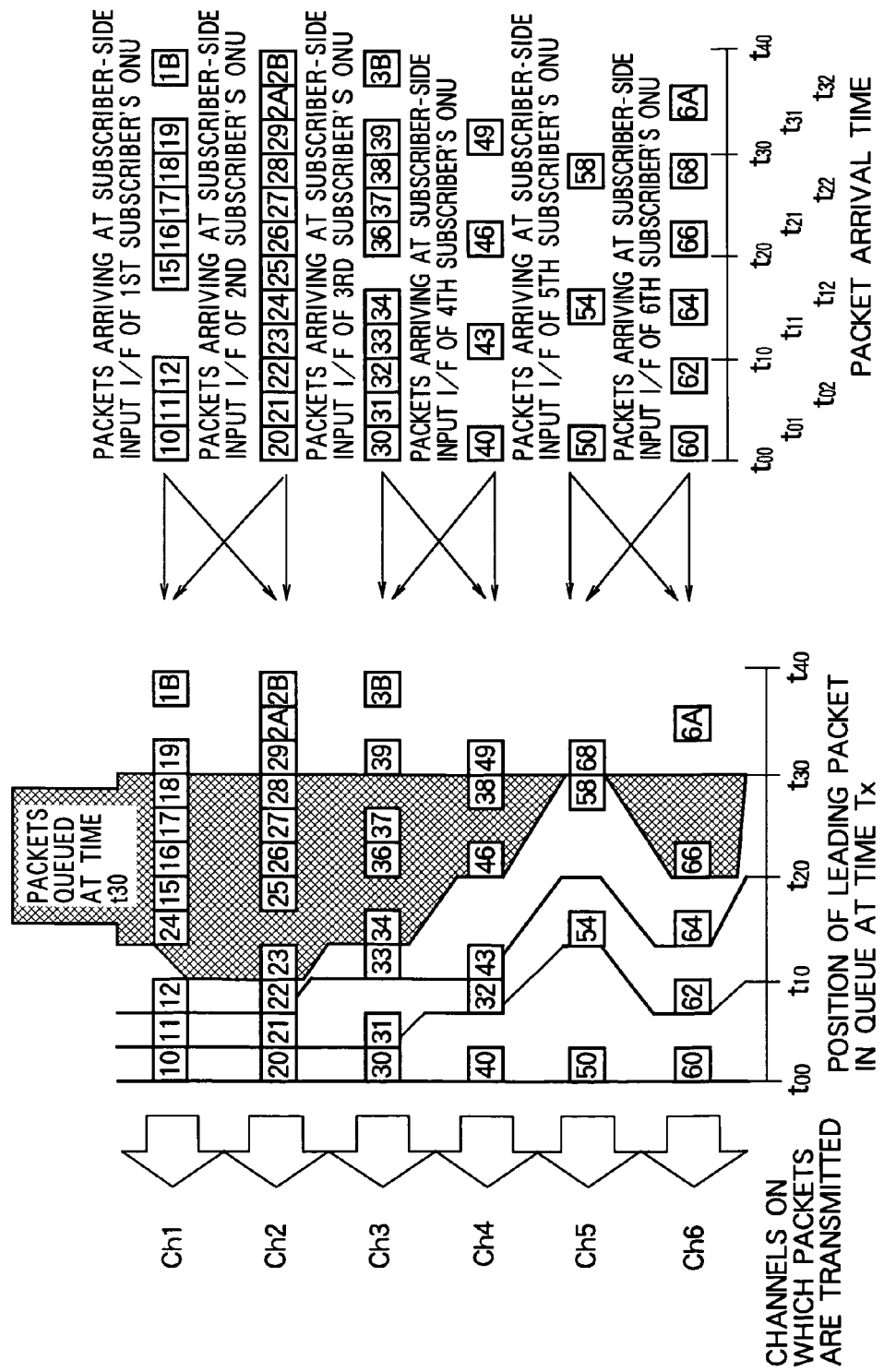
FIG. 16 illustrates the operation of the dynamic bandwidth allocation device of the comparative example in FIG. 14.
Figure 17:
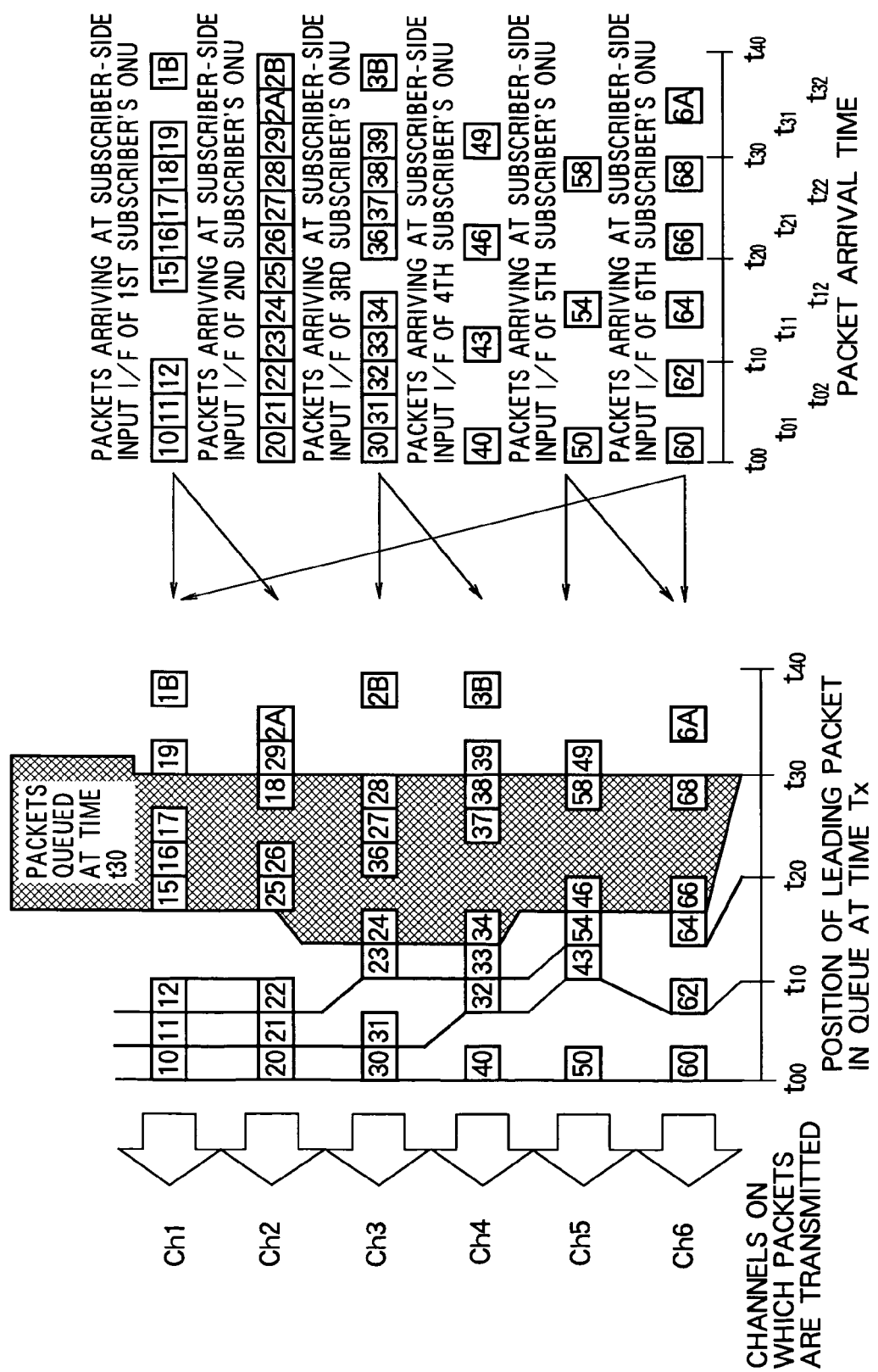
FIG. 17 illustrates the operation of the dynamic bandwidth allocation device according to the fourth embodiment.

The transmission channels and timings of the upstream packets and the internal states of the queues, in comparison with the comparative example, will now be described with reference to FIGS. 16 and 17. It will be assumed that all the packets shown in FIGS. 16 and 17 are non-priority packets, and that no priority packets are present in the illustrated span of time. It will also be assumed that the subscriber devices are capable of receiving input at three times the transmission channel speed, and that packets that cannot be transmitted await transmission in queue 92b. It will be assumed that in this invention, packets arrive at the subscriber I/F 91 of each subscriber device as shown in the right-hand part of FIG. 16. For example, upstream signals arrive at the first subscriber device at timings t00, t01, t02, t12, t20, t21, t22, t30, and t32. The arriving packets are transmitted on the channels indicated in the left-hand part of FIG. 16. For example, packets '20'-'23' are transmitted from the second subscriber device on channel two and packets '24' and '25' are transmitted at the same timing on channels one and two. When packet '24' arrives at the second subscriber device, the second subscriber device has more packets awaiting transmission than does the first subscriber device, and since no packet arrives at the first subscriber device, the control functional unit 81 instructs the first subscriber device to suspend transmission at t30 and instructs the second subscriber device to transmit on both channels one and two. This type of operation prevents overflow of packets from the transmission queues of a subscriber device by making greater use of a shared channel when the other subscriber device with which the channel is shared has little transmission activity.

The fourth embodiment shown in FIG. 15 also prevents overflow of packets from the queues by preferential output of the packets of subscriber devices in which more packets have accumulated, in the non-priority queues 92b. The fourth embodiment, however, shares buffers in a different way from the comparative example in FIG. 14. In the comparative example, two subscribers' devices form a pair that mutually shares two channels. Therefore, when there is heavy traffic on one of the subscriber's devices, if traffic is also heavy on the other, packets accumulate rapidly in the queues and can easily overflow. The fourth embodiment, however, instead of having two subscribers' devices share the same two channels, has the subscriber device holding the k-th subscriber number share one channel with the subscriber device holding the (k−1)-th subscriber number and another channel with the subscriber device holding the (k+1)-th subscriber number. Therefore, if the channels of the first, second, third, and fourth subscribers are crowded and the channels of the fifth and sixth subscribers are vacant, traffic can be shifted little by little away from the crowded first to fourth channels and redirected to the fifth and sixth subscribers' devices. In channels two and three, for example, packets '23' and '33' are shifted one channel each when transmitted. Channel four, which receives the impact of this shift, is controlled so that it can more easily receive input from channel three, by shifting packet '43' into vacant channel five. With this type of control, in timeslot t30, for example, although in the comparative example there were two subscriber devices with a maximum accumulation of five packets in their queues, in the present invention, a maximum of four packets accumulate in the queues. At timing t40, the maximum number of accumulated packets is seven in the comparative example, and five in the present invention. Buffer overflow from the queues is accordingly less likely to occur.

Accordingly, if the present invention is used, it is possible to use bandwidth more efficiently, making the loss of packets due to queue overflow less likely. The working of the scheduler 82 that determines the timings and channels of output from each subscriber device is for this reason important. Four methods of using bandwidth efficiently will be described below.

The first method is to determine the maximum queue length of the queues when the k-th subscriber device transmits a packet on its default channel and when it transmits the packet on another channel, and switch the channel used to transmit the packet so as to reduce the maximum queue length. In FIG. 15, output on the channel number matching the subscriber number is the default. In another embodiment, one subscriber device has three channels, of which one or two are default channels and the other two or one may be used for shifting.

The second method is to determine the time of input of the oldest packet left in the queues when the k-th subscriber device transmits a packet on its default channel and when it transmits the packet on another channel, and switch the channels used to transmit the packets so as to make this time the most recent. That is, this method prevents packet accumulation by determining whether it can output more old packets by outputting the packets that arrive at the devices on their default channels or by shifting the outputs, and making allocations so as to output more older packets.

The third method is, when the maximum queue lengths are determined to be equal, to determine the time of input of the oldest packet left in the queues when the k-th subscriber device transmits a packet on its default channel and when it transmits the packet on another channel, and switch the channels used to transmit the packets so as to make this time the most recent. This method is a combination of the first and second methods. For example, it first makes allocations that minimize the maximum queue length, and if the maximum queue length is the same either way, it makes allocations such that more older packets can be output. Conversely, it makes allocations such that more older packets can be output, and when shifting or not shifting makes no difference, it makes allocations that minimize the maximum queue length. When the maximum queue length is the same, it is also possible to determine the time of input of the oldest packet left in the queues when the k-th subscriber device transmits a packet on its default channel and when it transmits the packet on another channel, and switch the channels used to transmit the packets so as to make this time the most recent.

The fourth method is to compare the volumes of packets arriving in the queues of the subscriber devices, comparing one subscriber device with another, and allocate channels so as to give priority to transmission from the subscriber devices in which the most packets have accumulated. Instead of making an allocation as soon as a packet arrives, this method waits awhile, and performs an allocation that can use the bandwidth most efficiently after seeing how accumulations build up. The fourth method can be combined with the first to third methods.

<<4-3>> Effect of the Fourth Embodiment

According to the dynamic bandwidth allocation method and dynamic bandwidth allocation device 1000 in the fourth embodiment, in a transmission system with shared channels, bandwidth can be used efficiently and transmission can be performed efficiently even when the terminals are equipped with few channels, as described above.

The switching office equipment in the fourth embodiment is not limited to the equipment described in the first to third embodiments.

<<5>> Fifth Embodiment 5-1>> Structure of the Fifth Embodiment

Figure 18:
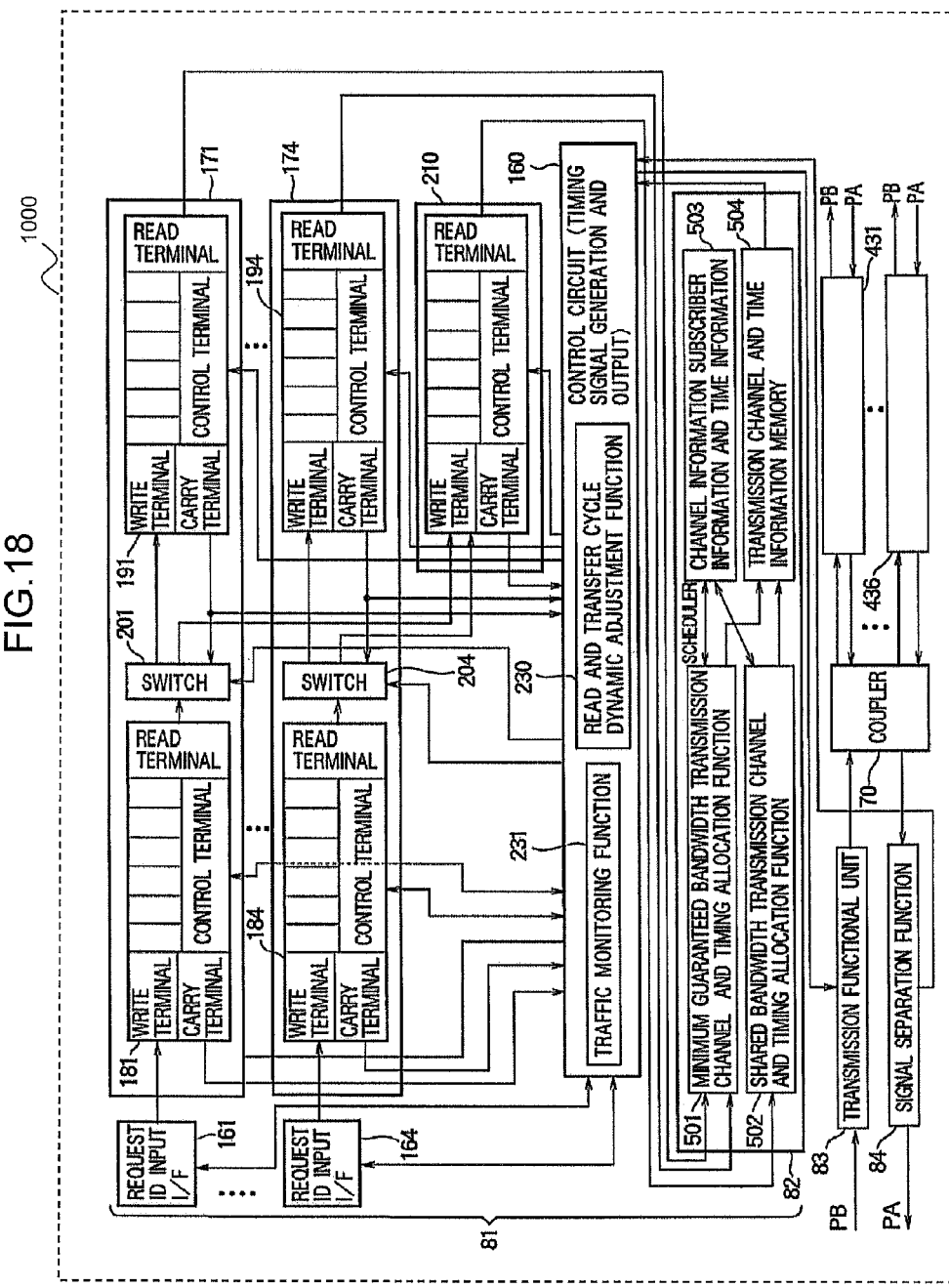
FIG. 18 is a block diagram schematically showing the structure of a dynamic bandwidth allocation device according to a fifth embodiment.

FIG. 18 is a block diagram schematically showing the structure of the dynamic bandwidth allocation device 1000 according to a fifth embodiment. The dynamic bandwidth allocation device 1000 according to the fifth embodiment combines the subscriber devices 431, . . . , 436 of the dynamic bandwidth allocation device 1000 according to the fourth embodiment with the switching office equipment of the dynamic bandwidth allocation device 1000 according to the second embodiment. Accordingly, elements identical to or corresponding to elements in FIG. 10 (the second embodiment) have the same reference characters, and elements identical to or corresponding to elements in FIG. 15 (the fourth embodiment) have the same reference characters. It is also possible to combine the subscriber devices 431, . . . , 436 of the dynamic bandwidth allocation device 1000 according to the fourth embodiment with the switching office equipment of the dynamic bandwidth allocation device 1000 described in the first or third embodiment.

The functional unit that decides 1000 whether or not a transmission request can be accepted or not is shown at the top of FIG. 18 and has the same structure as in FIG. 10 (the second embodiment). As already described, a transmission request ID read from a second FIFO 191 corresponding to a second 'leaky bucket' (e.g., bucket 121 in FIG. 9) is sent to a minimum guaranteed bandwidth transmission channel and timing allocation functional unit 501 in the scheduler 82 as information that can be transmitted from the minimum guaranteed bandwidth, and a transmission request ID read from the third FIFO is sent to a shared bandwidth transmission channel and timing allocation functional unit 502 in the scheduler 82 as information that can be transmitted from the shared bandwidth. The scheduler 82 is provided with a channel information, subscriber information, and time information holding means 503 in which information indicating which subscriber device can transmit in which channel, information indicating the standard transmitting timeslot time, and other such information is stored. Information about the transmission channels and times allocated for transmission by the subscriber devices as a result of calculation is stored in a transmittable channel and time information memory unit 504, and on the basis of this information, the control circuit 160 provides each subscriber device with information as to the channel on which it may transmit and the times to start and end. On the basis of this information, the subscriber devices 431, . . . , 436 start transmitting on the specified channels at the specified times. The transmittable channels are allocated cyclically.

<<5-2>> Operation of the Fifth Embodiment

The operation of the dynamic bandwidth allocation device according to the fifth embodiment is based on the second and fourth embodiments. FIG. 19 shows an exemplary sequence of signals transmitted from the subscriber devices 431, . . . , 436. The timeslot periods allocated for the minimum guaranteed bandwidth in each channel are always allocated in a fixed cyclic sequence to the subscriber devices 431, . . . , 436 for transmission use. The timeslots used as the shared bandwidth (the shared bandwidth timeslots) are shared by the plurality of subscriber devices 431, . . . , 436; the switching office equipment 80, given the transmission requests from the subscriber devices 431, . . . , 436, decides who to permit to transmit and notifies the subscriber devices 431, . . . , 436. The timeslots used for the minimum guaranteed bandwidth correspond to the second 'leaky buckets' or the request IDs read from the second FIFOs, and their bandwidths are equal in size. The timeslots used as the shared bandwidth correspond to the third 'leaky bucket' or the request IDs read from the third FIFO, and their bandwidths are equal in size. As shown in the second embodiment, when there is not enough traffic flow to fill the minimum guaranteed bandwidths, their time may be used to transmit traffic, if any, that has accumulated in the third 'leaky bucket'.

If the shared channel allocation shown in the fourth embodiment is carried out, when a large bandwidth is requested by a particular subscriber device, to avoid congestion, the shared bandwidth transmission channel and timing allocation functional unit 502 allocates channels by the first to fourth methods already described in the fourth embodiment.

<<5-3>> Effect of the Fifth Embodiment

If the dynamic bandwidth allocation device 1000 according to the fifth embodiment is used, dynamic bandwidth allocation for use in communication with specified minimum guaranteed bandwidths and a specified maximum communicable bandwidth is possible among subscriber devices 431, . . . , 436 that share bandwidth, and a communication system can be provided with channel allocations that tend to avoid congestion, even when the number of available channels is limited and some of the subscriber devices have heavy traffic, as described above.

Aside from the above points, the fifth embodiment is identical to the first through fourth embodiments.

EXPLANATION OF REFERENCE CHARACTERS

51, . . . , 54 terminal; 61, . . . , 64 subscriber device (network unit); 70 coupler (splitter); 80 switching office equipment; 81 control functional unit; 82 scheduler; 83 transmission functional unit; 84 signal separation functional unit; 91 input I/F; 92 queue; 93 switch (SW); 94, 95 signal output unit; 96 coupler; 97 wavelength multiplexer/demultiplexer; 98 signal separation functional unit; 99 control functional unit; 100 output I/F; 111, . . . , 114 first information holding means; 121, . . . , 124 second information holding means; 130 third information holding means; 140 information merging means; 141 first junction; 142 first pipe; 143 second pipe; 144 second junction; 145 third pipe; 160 control circuit (timing signal generation and output unit); 161, . . . , 164 request ID input I/F; 171, . . . , 174 subscriber circuit; 171a first priority queue circuit; 171b second priority queue circuit; 171c third priority queue circuit; 181, . . . , 184 first FIFO memory; 190, . . . , 194 second FIFO memory; 210 third FIFO memory; 221 first input selector; 222 second input selector; 230 read and transfer cycle dynamic adjustment functional unit; 231 traffic monitoring functional unit; 241, 244 subscriber device (network unit); 321 first input selector; 322 second input selector; 400 fourth FIFO memory.

What is claimed is:
1. A dynamic bandwidth allocation method used by a control unit placed in a switching office equipment, in transmission of packets from a plurality of terminals through subscriber devices to the switching office equipment, to allocate bandwidth to the subscriber devices for use in transmitting information, the dynamic bandwidth allocation method comprising:
   a step of sending a bandwidth request signal that requests bandwidth for transmitting the packets from the subscriber devices to the switching office equipment, from at least one of the subscriber devices to the control unit;
   a step in which the control unit permits said transmission in a minimum guaranteed bandwidth predetermined for each of the subscriber devices and generates control data for allocating bandwidth made available to the subscriber devices so as to maximize the bandwidth the subscriber devices can use to transmit the packets within a maximum transmittable bandwidth obtained by subtracting a sum of the minimum guaranteed bandwidths for the plurality of subscriber devices from a bandwidth available for said transmission by the entire plurality of the subscriber devices;
   a step in which the control unit notifies each of the subscriber devices of the bandwidth in which it may transmit by sending the control data to the subscriber devices; and
   a step in which the subscriber devices transmit packets in the bandwidth of which notification is received from the control unit; wherein
   the step of generating the control data is executed by use of a plurality of pairs of a first information holding means and a second information holding means provided, for each of the subscriber devices, in the control unit, a third information holding means provided, for the subscriber devices in common, in the control unit, and a control means, and each of the first, second, and third information holding means has a function of outputting a fixed quantity of tokens held in the respective holding means that correspond to the packets based on receiving the bandwidth request signal at fixed temporal intervals, and a function of outputting tokens held in the respective holding means, when the held tokens exceed a predetermined amount, and
   the step of generating the control data includes:
   a step in which tokens corresponding to the bandwidth request signal are input to the first information holding means in each pair,
   a step in which, in said each pair, an action of outputting a fixed quantity of tokens from the first information holding means is carried out at fixed intervals and the output tokens are input to the second information holding means,
   a step in which, in said each pair, an action of outputting a fixed quantity of tokens from the second information holding means is carried out at fixed intervals,
   a step in which tokens of the second information holding means that exceed the predetermined amount are output from the second information holding means to the third information holding means in said each pair, and
   a step in which the control means sends the control data based on the output tokens from the second and third information holding means, to the subscriber devices.

2. The dynamic bandwidth allocation method of claim 1, wherein:
   the control unit includes a timing signal generating means for generating timings pertaining to the transmission of the packets from the subscriber devices; and
   the control data include information pertaining to the timings and times of the transmission of the packets from the subscriber devices.

3. The dynamic bandwidth allocation method of claim 1, further comprising:
a step in which the control unit determines priorities for the transmission of the packets from the subscriber devices according to an allowed delay time determined by the control unit.

4. The dynamic bandwidth allocation method of claim 1, further comprising:
a step in which the control unit determines at least one of an importance of the packets transmitted from the subscriber devices and a possibility of recovery by error correction; and
a step in which the control unit executes a purge of the output tokens from the first, second, and third information holding means in descending order of the possibility of recovery as thus determined.

5. The dynamic bandwidth allocation method of claim 1, wherein the step in which tokens corresponding to the bandwidth request signal are input to the first information holding means, the step in which, in said each pair, an action of outputting a fixed quantity of tokens from the first information holding means is carried out at fixed intervals and the output tokens are input to the second information holding means, the step in which, in said each pair, an action of outputting a fixed quantity of tokens from the second information holding means is carried out at fixed intervals, and the step in which tokens of the second information holding means that exceed the predetermined amount are output from the second information holding means to the third information holding means in said each pair are executed by different means according to packet priority.

6. The dynamic bandwidth allocation method of claim 1, further comprising a step in which the control unit increases the quantity of tokens output from the third information holding means when the packets transmitted from any one of the plurality of subscriber devices are transmitted in less bandwidth than the minimum guaranteed bandwidth.

7. The dynamic bandwidth allocation method of claim 6, further comprising a step in which the control unit increases the quantity of tokens output from the third information holding means after there are no more tokens held in the second information holding means.

8. The dynamic bandwidth allocation method of claim 1, wherein the step of generating the control data is executed by use of a fourth information holding means provided in the control unit, operable to output a fixed quantity of packets at fixed intervals and to output tokens of the fourth information holding means that exceed the predetermined amount, and
the step of generating the control data includes:
a step in which tokens corresponding to the bandwidth request signal are input to the first information holding means in each pair,
a step in which, in said each pair, an action for outputting a fixed quantity of tokens from the first information holding means is carried out at fixed intervals and the output tokens are input to the second information holding means,
a step in which tokens of the first information holding means that exceed the predetermined amount are output from the first information holding means to the fourth information holding means in said each pair,
a step in which, in said each pair, an action for outputting a fixed quantity of tokens from the second information holding means is carried out at fixed intervals,
a step in which tokens of the second information holding means that exceed the predetermined amount are output from the second information holding means to the third information holding means in said each pair,
a step in which tokens of the third information holding means that exceed a predetermined amount are output from the third information holding means to the fourth information holding means, and
a step in which the control means sends the control data based on the output tokens from the second and third information holding means, to the subscriber devices.

9. A dynamic bandwidth allocation method used by a control unit placed in a switching office equipment, in transmission of packets from a plurality of terminals through subscriber devices to the switching office equipment, to allocate bandwidth to the subscriber devices for use in transmitting information, the dynamic bandwidth allocation method comprising:
a step of sending a bandwidth request signal that requests bandwidth for transmitting the packets from the subscriber devices to the switching office equipment, from at least one of the subscriber devices to the control unit;
a step in which the control unit permits transmission in a minimum guaranteed bandwidth predetermined for each of the subscriber devices and generates control data for allocating bandwidth made available to the subscriber devices so as to increase the bandwidth the subscriber devices can use to transmit packets within a maximum transmittable bandwidth obtained by subtracting a sum of the minimum guaranteed bandwidths for the plurality of subscriber devices from a bandwidth available for transmission by the entire plurality of the subscriber devices;
a step in which the control unit notifies each of the subscriber devices of the bandwidth in which it may transmit by sending the control data to the subscriber devices; and
a step in which the subscriber devices transmit packets in the bandwidth specified by the control unit; wherein
a k-th one of the plurality of subscriber devices (k being an integer from one to N, N being an integer equal to or greater than three) has a queue for holding packets, and k-th and (k+1)-th channels that transmit held packets in the queue; and
a step of selecting either the k-th or the (k+1)-th channel for packet transmission according to the control data in the k-th subscriber device that is any one from the first to the (N−1)-th, and selecting either the N-th or the first channel for packet transmission according to the control data in the N-th subscriber device.

10. The dynamic bandwidth allocation method of claim 9, further comprising a step of determining a maximum length of the queue with respect to the channels transmitting packets, and switching the channel for packet transmission so as to reduce the maximum queue length.

11. The dynamic bandwidth allocation method of claim 10, further comprising a step of determining an input time of an oldest packet stored in the queue with respect to the channels transmitting packets based on the respective length of the maximum queue being determined to be identical each other, and switching the channel so as to transmit more old packets.

12. The dynamic bandwidth allocation method of claim 10, further comprising a step of determining an input time of an oldest packet stored in the queue with respect to the channels transmitting packets based on the respective length of the maximum queue being identical each other, and switching the channel so as to transmit more old packets.

13. The dynamic bandwidth allocation method of claim 9, further comprising a step of determining an input time of an oldest packet stored in the queue with respect to the channels transmitting packets, and switching the channel so as to transmit more old packets.

14. The dynamic bandwidth allocation method of claim 9, wherein quantities of the packets stored in the queues of the subscriber devices are compared, and channels are allocated so as to give priority to transmission from the subscriber device that has a largest stored quantity of devices with the most accumulated packets.

15. A dynamic bandwidth allocation device used by a control unit placed in a switching office equipment, in transmission of packets from a plurality of terminals through subscriber devices to the switching office equipment, to allocate bandwidth to the subscriber devices for use in transmitting information, the dynamic bandwidth allocation device comprising:

means, provided in each of the subscriber devices, for sending a bandwidth request signal that requests bandwidth for transmitting the packets from the subscriber devices to the switching office equipment, from at least one of the subscriber devices to the control unit;

means provided in the control unit to permit said transmission in a minimum guaranteed bandwidth predetermined for each of the subscriber devices and generate control data for allocating bandwidth made available to the subscriber devices so as to increase the bandwidth the subscriber devices can use to transmit packets within a maximum transmittable bandwidth obtained by subtracting a sum of the minimum guaranteed bandwidths for the plurality of subscriber devices from a bandwidth available for transmission by the entire plurality of the subscriber devices;

means provided in the control unit to notify each of the subscriber devices of the bandwidth in which it may transmit by sending the control data to the subscriber devices; and means provided in each of the subscriber devices to transmit packets in the bandwidth of which notification is received from the control unit; wherein a k-th one of the plurality of subscriber devices (k being an integer from one to N, N being an integer equal to or greater than three) has a queue for holding packets and, k-th and (k+1)-th channels that transmit held packets in the queue;

the k-th subscriber device that is any one from the first to the (N−1)-th has means for selecting either the k-th or the (k+1)-th channel for packet transmission according to the control data; and the N-th subscriber device has means for selecting either the N-th or the first channel for packet transmission according to the control data.

16. The dynamic bandwidth allocation device of claim 15, further comprising a means for determining a maximum length of the queue with respect to the channels transmitting packets, and switching the channel for packet transmission so as to reduce the maximum queue length.

17. The dynamic bandwidth allocation device of claim 15, further comprising a means for determining an input time of an oldest packet stored in the queue, and switching the channel so as to transmit more old packets.

18. The dynamic bandwidth allocation device of claim 15, further comprising a means for determining an input time of an oldest packet stored in the queue with respect to the channels transmitting packets based on the respective length of the maximum queue being determined to be identical each other, and switching the channel so as to transmit more old packets.

19. The dynamic bandwidth allocation device of claim 15, further comprising a means for determining an input time of an oldest packet stored in the queue with respect to the channels transmitting packets based on the respective length of the maximum queue being identical each other, and switching the channel so as to transmit more old packets.

20. The dynamic bandwidth allocation device of claim 15, wherein quantities of the packets stored in the queues of the subscriber devices are compared, and channels are allocated so as to give priority to transmission from the subscriber device that has a largest stored quantity of packets.

* * * * *